US012447093B2

(12) United States Patent
Devanaboyina

(10) Patent No.: US 12,447,093 B2
(45) Date of Patent: Oct. 21, 2025

(54) SYSTEM AND METHOD FOR EXERTING A GRADIENT OF COMPRESSIVE FORCES ON A BODY

(71) Applicant: Uday Devanaboyina, Fremont, CA (US)

(72) Inventor: Uday Devanaboyina, Fremont, CA (US)

( * ) Notice: Subject to any disclaimer, the term of this patent is extended or adjusted under 35 U.S.C. 154(b) by 153 days.

(21) Appl. No.: 16/490,579

(22) PCT Filed: Mar. 5, 2018

(86) PCT No.: PCT/US2018/020901
§ 371 (c)(1),
(2) Date: Sep. 2, 2019

(87) PCT Pub. No.: WO2018/161074
PCT Pub. Date: Sep. 7, 2018

(65) Prior Publication Data
US 2020/0016025 A1 Jan. 16, 2020

Related U.S. Application Data

(60) Provisional application No. 62/466,672, filed on Mar. 3, 2017.

(51) Int. Cl.
*A61H 9/00* (2006.01)
*A61H 23/04* (2006.01)
(Continued)

(52) U.S. Cl.
CPC ........... *A61H 9/0078* (2013.01); *A61H 23/04* (2013.01); *A63B 22/02* (2013.01); *A63B 22/04* (2013.01);
(Continued)

(58) Field of Classification Search
CPC ...... A61H 1/006; A61H 1/008; A61H 9/0078; A61H 23/04; A61H 2009/0014;
(Continued)

(56) References Cited

U.S. PATENT DOCUMENTS 2,954,562 A * 10/1960 Krupp .................... A62B 17/00 2/2.14
3,521,621 A * 7/1970 Smith .................. A61H 9/0021 601/17
(Continued)

FOREIGN PATENT DOCUMENTS

| | | | |
|---|---|---|---|
| EP | 0181814 | A1 | 5/1986 |
| WO | 2009/151630 | A1 | 12/2009 |
| WO | 2014/138504 | A1 | 9/2014 |

OTHER PUBLICATIONS

International Search Report and Written Opinion, issued by the European Patent Office as the ISA, dated May 22, 2018 of parent International Patent Application No. PCT/US2018/020901, 16 pages.

*Primary Examiner* — Timothy A Stanis
(74) *Attorney, Agent, or Firm* — Raj S. Dave; Dave Law Group LLC

(57) ABSTRACT

The disclosure describes a system and a method for applying a gradient of external compressive forces on the body of a person, in a manner analogous to how water exerts hydrostatic forces on the body of a person immersed in water. According to an embodiment, the system may be a chair or a suit and is applicable for effecting physiological changes in the body such as increased diuresis and/or amniotic fluid levels, preeclampsia treatment in pregnant women, reduced hypertension, shift in fluids from interstitial space into intravascular compartment, increased venous return from lower extremities, reduced sympathetic tone and total
(Continued)

peripheral resistance, reduced work load on the heart, reduced motion sickness, and the like.

20 Claims, 15 Drawing Sheets

(51) Int. Cl.
*A63B 22/02* (2006.01)
*A63B 22/04* (2006.01)
*A63B 22/06* (2006.01)

(52) U.S. Cl.
CPC ...... *A63B 22/06* (2013.01); *A61H 2009/0014* (2013.01); *A61H 2023/045* (2013.01); *A61H 2201/0142* (2013.01); *A61H 2201/0149* (2013.01); *A61H 2201/1645* (2013.01); *A61H 2201/165* (2013.01); *A61H 2201/1654* (2013.01); *A61H 2201/169* (2013.01); *A61H 2203/0406* (2013.01); *A61H 2203/0431* (2013.01); *A61H 2203/0456* (2013.01); *A61H 2205/106* (2013.01); *A61H 2209/00* (2013.01)

(58) Field of Classification Search
CPC ........ A61H 2023/045; A61H 2035/004; A61H 2201/0142; A61H 2201/0149; A61H 2201/1621; A61H 2201/1645; A61H 2201/165; A61H 2201/1654; A61H 2201/168; A61H 2201/169; A61H 2203/02; A61H 2203/0406; A61H 2203/0431; A61H 2203/0456; A61H 2205/106; A61H 2209/00; A63B 22/02; A63B 22/04; A63B 22/06; A63B 2208/05; A63B 2213/00; A47K 3/00; A47K 3/006
See application file for complete search history.

(56) References Cited

U.S. PATENT DOCUMENTS

| | | | | | |
|---|---|---|---|---|---|
| 3,659,593 | A * | 5/1972 | Vail | A61H 9/0078 | 601/151 |
| 3,880,154 | A * | 4/1975 | Gabmeier | A61H 33/0087 | 601/157 |
| 3,942,525 | A * | 3/1976 | Dragan | A61F 5/0118 | 473/62 |
| 4,780,916 | A * | 11/1988 | Sutton | A61H 33/60 | 601/168 |
| 5,170,783 | A * | 12/1992 | Smith | A61F 7/10 | 607/104 |
| 5,891,065 | A * | 4/1999 | Cariapa | A61H 9/0078 | 601/149 |
| 6,027,464 | A * | 2/2000 | Dahlquist | A61H 1/0229 | 601/151 |
| 6,406,445 | B1 * | 6/2002 | Ben-Nun | A61H 9/0078 | 601/149 |
| 6,948,727 | B1 * | 9/2005 | Bakken | A61H 3/04 | 135/67 |
| 7,384,379 | B2 * | 6/2008 | Egger | A61H 9/005 | 482/148 |
| 10,265,237 | B2 * | 4/2019 | Devanaboyina | A63B 21/00181 | |
| 10,300,180 | B1 * | 5/2019 | Quisenberry | A61N 5/0624 | |
| 11,071,678 | B2 * | 7/2021 | Devanaboyina | A61H 9/0078 | |
| 11,154,452 | B2 * | 10/2021 | Chase | B64G 6/00 | 156/218 |
| 2005/0070405 | A1 * | 3/2005 | Egger | A61H 9/0071 | 482/78 |
| 2005/0159690 | A1 * | 7/2005 | Barak | A61H 9/0078 | 601/149 |
| 2006/0080772 | A1 * | 4/2006 | Saiz | A47K 3/006 | 4/596 |
| 2006/0189905 | A1 * | 8/2006 | Eischen, Sr. | A61H 9/0085 | 601/151 |
| 2007/0088239 | A1 * | 4/2007 | Roth | A61H 9/0078 | 601/152 |
| 2008/0004677 | A1 * | 1/2008 | Gay | A61H 23/04 | 4/584 |
| 2008/0103029 | A1 * | 5/2008 | De Figueiredo Silva | A63B 21/008 | 482/58 |
| 2010/0137764 | A1 * | 6/2010 | Eddy | A61H 1/008 | 601/152 |
| 2010/0268130 | A1 * | 10/2010 | Khan | A61H 9/0078 | 601/150 |
| 2011/0139835 | A1 * | 6/2011 | Fikes | A47G 25/90 | 223/111 |
| 2012/0022415 | A1 * | 1/2012 | Mullen | A61H 9/0078 | 601/150 |
| 2014/0101841 | A1 * | 4/2014 | Bentley | A47K 3/02 | 29/428 |
| 2016/0022537 | A1 * | 1/2016 | Lee | A61H 33/6005 | 4/531 |
| 2016/0271012 | A1 * | 9/2016 | Xu | A61H 33/6021 | |
| 2016/0317370 | A1 * | 11/2016 | Evans | G05B 15/02 | |
| 2017/0273851 | A1 * | 9/2017 | Larmer | A61H 9/0092 | |
| 2017/0340512 | A1 * | 11/2017 | Kang | A61F 7/0053 | |

* cited by examiner

SYSTEM AND METHOD FOR EXERTING A GRADIENT OF COMPRESSIVE FORCES ON A BODY

CROSS-REFERENCE TO RELATED APPLICATIONS

The present application is the U.S. national stage application to International Patent Application No. PCT/US2018/020901, filed Mar. 5, 2018, which claims the benefit of priority of U.S. Provisional Application No. 62/466,672, filed Mar. 3, 2017, which are incorporated by reference herein in their entireties.

BACKGROUND OF THE INVENTION

Field of Invention

The present invention relates to a system and a method to exert a gradient of external compressive forces on the body of a person, including various internal organ systems, and redistribute the weight, in a manner similar to how water exerts a gradient of hydrostatic forces on the body of the immersed person. Without limitation, by way of example, several embodiments of the system including a chair, a wearable suit and a stretcher to exert pressure on the body are described. In the preferred embodiment, the present invention relates to a chair that comprises of bladders containing a substance to exert a gradient of pressure forces on the body and a frame to redistribute and support the weight of the person. Potential applications of the technology, without any limitation, include treatment of hypertension, heart failure, pregnancy disorders including preeclampsia, chronic venous insufficiency, venous ulcers, lymphedema, pressure ulcers, clinical shock, edema, nausea and vomiting, motion sickness, dialysis, compartment syndrome and sleep apnea. The technology may also be useful in various consumer products including seats, beds, chairs and the like.

Overall Objectives and Prior Art

The application is directed at a device and a method for exerting an external gradient of pressure on the body including musculoskeletal, cardiovascular systems as well as intra- and extra-vascular fluid compartments in the body. The objective is to provide anon-pharmacological means to manage adverse changes in the body resulting from the gravitational forces on the body.

Some examples of various disease conditions in which gravitational forces likely play a significant role include excessive fluid accumulation in the interstitial spaces in the dependent portions of the body in various conditions, including congestive heart failure and chronic kidney disease. Additional conditions include treating preeclampsia in pregnant women, clinical shock, hypertension, heart failure, gestational disorders, chronic venous insufficiency, venous ulcers, lymphedema, sleep apnea, motion sickness, sleep apnea, venous ulcers, pressure ulcers, arthritis, and the like. Several therapeutic options are available to treat some of the conditions, for example, anti-diuretics (for edema and congestive heart failure), various anti-hypertensive medications (for high blood pressure) and medical devices such as continuous positive air way therapy devices (Continuous Positive Airway Pressure (CPAP) for treatment of sleep apnea). However, for some of the conditions such as preeclampsia, no effective treatment options are available. As a result, for example, preeclampsia alone claims a large number of lives, estimated to be about 70,000 women and 500,000 babies a year worldwide, but no effective treatment options to prevent or treat the conditions are available [Preeclampsia foundation: http://www.preeclampsia.org/health-information/about-preeclampsia; National Institute of Health: https://www.nichd.nih.gov/health/topics/preeclampsia/Pages/default.aspx]. Women that suffer from the preeclampsia condition are also at higher risk of developing cardiovascular disorders at later stages in the life. Similarly, chronic venous insufficiency and venous ulcers are treated using several invasive procedures (e.g., laser ablation of the affected vein) as well as using external compression (e.g., gradient pressure stockings). However, various external compression devices are either ineffective or too cumbersome and uncomfortable for regular usage, leading to poor patient compliance. The systems and methods proposed in this application are based on several observations that hydrostatic forces applied on the body following partial immersion in water result in significant benefits to cardiovascular and other systems in the body. For example, partial immersion in water of a pregnant women with gestational disorders resulted in significant improvement in various hemodynamic parameters and biochemical indicators associated with preeclampsia such as renin-angiotensin system [Kokot, et al, 1983, Katz, et al 1990, Katz, et al 1992, Elvan-Taspinar 2006] and increased amniotic fluid volume [Strong, T., 1993]. Similarly, head-out immersion of men and women of various age groups resulted in increased central volume, suppression of sympathetic tone, increased anti-natriuretic system activity [Epstein, M., 1992; Epstein, M., 1987; Grossman, et al 1992; Miwa et al 1996]. Since a swimming pool may not be convenient for every pregnant person, a chair enabled to exert hydrostatic forces is described in this application. It is anticipated that the chair can be placed in the home of the person, and used frequently without the fear of drowning and avoid getting wet or slipping on a wet surface. Gravitational forces also play a significant role in onset of clinical shock, a life-threatening condition that occurs in several disease conditions including sepsis, heart failure, hemorrhage, etc., when adequate blood pressure in the intravascular space is not maintained leading to lack of oxygen and nutrition supply to the critical organs such as brain. Both pharmacological and medical devices (for example, Military anti-shock trousers (MAST)) are used for management of clinical shock, with the objective of maintaining adequate blood pressure in the central compartment. MAST was introduced into 1970s the Emergency Medical Services (EMS), started carrying MAST from 1977 as an essential device in all ambulances based on recommendations from by the Committee on Trauma of the American College of Surgeons. [Dickinson K, Roberts I. MAST for circulatory support in patients with trauma. The Cochrane Library; 2001], [O'Connor R E, Domeier R. 1997, Use of Pneumatic Anti-Shock Garment (PASG): NAEMSP Position Paper. Prehosp Emerg Care. 1:32-5]. Although, MAST appear to have saved lives, its effectiveness and safety was questioned later in several publications [Lateef F and Kelvin T., 2008 Military anti-shock garment: Historical relic or a device with unrealized potential? J Emerg Trauma Shock. 1(2): 63-69.], [Krishna G G, Danovitch G M., 1984, Renal response to lower body positive pressure produced by military anti-shock trousers., Am J Nephrol., 4(1):13-8]. Therefore, there is an urgent need for safe and effective devices to manage clinical shock.

Various medical devices that exert external compression on the body include compression sleeves, compression pumps, bandages (e.g., ACE bandages), gradient compression stockings, External Counter Current Pulsation (ECCP) devices, mercury pressure therapy bath [Reference: Cartier, C. J., 1988, Pressure Therapy Using a Mercury Bath. Indications, and Results., Phlebologie, 1988, 41:379-390] are used to manage various conditions that result in fluid accumulation in lower extremities. However, still there is room for better technologies.

Motion sickness is another condition in which gravitational forces appear to play a significant role, which affects a large number of people under various conditions including travel by land or sea, while using simulators or virtual reality applications [Bertolini, G and Straumann, D., 2016, Moving in a Moving World: A Review on Vestibular Motion Sickness., Frontiers in Neurology. 2016; 7: 14.]. Several theories were proposed to explain the mechanism of motion sickness, including sensory conflict and postural instability in humans [Smart L J Jr, Stoffregen T A, Bardy B G. 2002, Hum Factors, 44(3):451-65]. Autonomic system plays a critical role in maintaining blood circulation and it uses feedback from visual clues in addition to somato-sensory input. Very often, for example, a person while driving a car does not experience motion sickness, however, the same person may become motion sick, if sitting in the car as a passenger, underscoring the importance of the maintaining a synchronous efferent response to the changes in afferent feedback. Therefore, a system and a method that exerts a gradient of pressure on the body and to redistribute weight in order to minimize overall proprioception from primary weight bearing regions of the body to minimize sensory conflict, and in some embodiments enabled to exert pressure on the body synchronized with the anticipated changes in the proprioception based on the visual feedback is described in this application for potential prevention or treatment of motion sickness.

Additionally, the system and method may be useful in management of various other disorders including but not limited to treating preeclampsia in pregnant women, sleep apnea, heart failure, treatment-resistant hypertension, orthostatic hypotension, chronic kidney disease, edema of the lower extremities, loss of tissue fluid in burn patients, to improve the efficiency of dialysis, reduce intradialytic hypotension and the like.

The system and method include but not limited to chairs, vehicle seats, beds, wearable suits to minimize the pressure on the weight bearing regions of the body, such as buttocks, spine, feet, joints, etc. Various embodiments of the chairs, beds and suits are described in the literature (U.S. Pat. Nos. 4,738,486, 4,189,181, 4,838,613, 4,391,466; Rothchild—U.S. Pat. No. 8,007,046—Assisting passenger while sleeping; Sereboff—U.S. Pat. No. 4,761,011—water cushion stress reducing assemblies for chairs and other seating devices), however, none of them teach how to apply gradient pressure on more than one side of the body, and redistribute the weight, to relieve stress on the weight bearing regions.

SUMMARY OF THE INVENTION

Based on the above stated prior art and the objectives, the overall goal of the present invention is to provide a system for exerting a gradient of pressure forces on various body parts of a person and to redistribute the weight to counteract the adverse effects of the gravitational forces on the body. In preferred embodiments, the forces may be similar to hydrostatic forces exerted by fluids. For the purpose of description the phrases "redistribution of the body weight" and "off-loading of the weight" are used interchangeably to refer to the mechanism wherein redistribution of the load from the primary weight bearing regions to the larger surface of the body results in off-loading of the weight onto an external supporting structure.

Another objective of the present invention is to provide at least one flexible container such as a bladder to hold a substance, that may be a fluid in preferred embodiments, which is conformed around the contours of limb, torso or other portions of the body.

An additional objective of the present invention is to provide a system to allow a person to experience buoyancy forces and/or the feeling of weightlessness without coming in direct contact with the fluid or getting into a swimming pool.

Still an additional objective of the present invention is to redistribute the weight of the person from primary weight bearing parts (e.g., feet, ankle, knee, hip and vertebral joints while standing up right, or buttocks and underside of the thighs while seated in a chair) to larger body surface to minimize the pressure on respective weight bearing areas. The redistribution of weight from the primary weight-bearing regions to larger surface of the body, further decreases the sympathetic activity.

Another objective of the present invention is to provide a frame, which may be rigid or semi-flexible to provide support to the bladders containing the medium to enable the medium to exert a gradient of forces on the body, and support the off-loaded weight of the person, and enabled to transfer the body weight onto an external support, regardless of the position of the body.

Another objective of the present invention is to provide a system to reduce the friction on the surface of the body, the bladders, and or the frame to allow for free movement; such friction reducing modalities may include but not limited to ball bearings, rollers, or other devices that serve this function. Various friction reducing modalities may also be used in conjunction with wraps, casts or various bandages.

Still another objective of the present invention is to provide an embodiment of a device that can be in the form of a furniture (e.g., chair, bed, seat), a wearable suit, a vest, a cast, or in the form of a stretcher to exert a gradient of forces on the body of the person and redistribute weight from primary weight bearing regions to larger surface of the body.

An additional objective of the present invention is to provide a device (e.g., an aquatic stationary bike, aquatic treadmill, standard bicycle) that offers the benefits of an aquatic exercise, without the person stepping into a body of water such as a swimming pool for exercising. The device allows the person to exercise on land, but still be able to experience the buoyancy forces and therefore can be used for therapeutic exercise by wide variety of people (e.g., young or old persons, pregnant women, heart failure or arthritis patients).

Yet another objective of the present invention is to provide an external compressive system that exerts a gradient of variable pressure force depending on the position of individual body parts and redistribute weight from primary weight bearing regions to larger surface of the body.

Still another object of the present invention is to provide a system and method for treatment various conditions, related to the adverse effects of the gravitational forces on the body, including but not limited to preeclampsia, heart failure, clinical shock, hypertension, edema, lymphedema of arms and legs, sleep apnea, pressure ulcers, compartment syndrome, interdialytic hypotension that occurs during or after dialysis and the like.

Another objective of this application is to provide a system and method to minimize discomfort to people while seated, lying down, traveling by reducing the load on the musculoskeletal system, joints, and for minimizing adverse effects related to motion sickness while traveling or using virtual or augmented reality applications for entertainment purposes.

Still another objective of the invention is to provide a system and method for reducing the vascular sympathetic tone and total peripheral resistance in the body.

BRIEF DESCRIPTION OF THE DRAWINGS

The present invention will be understood and appreciated more fully from the following detailed description, taken in conjunction with the drawing in which.

DETAILED DESCRIPTION OF THE PREFERRED EMBODIMENT

The application describes at least five different embodiments of the system to exert a gradient pressure on the body of a person and redistribute weight from primary weight bearing regions to larger surface of the body, all of them use the same principle to exert such pressure.

Figure 1:
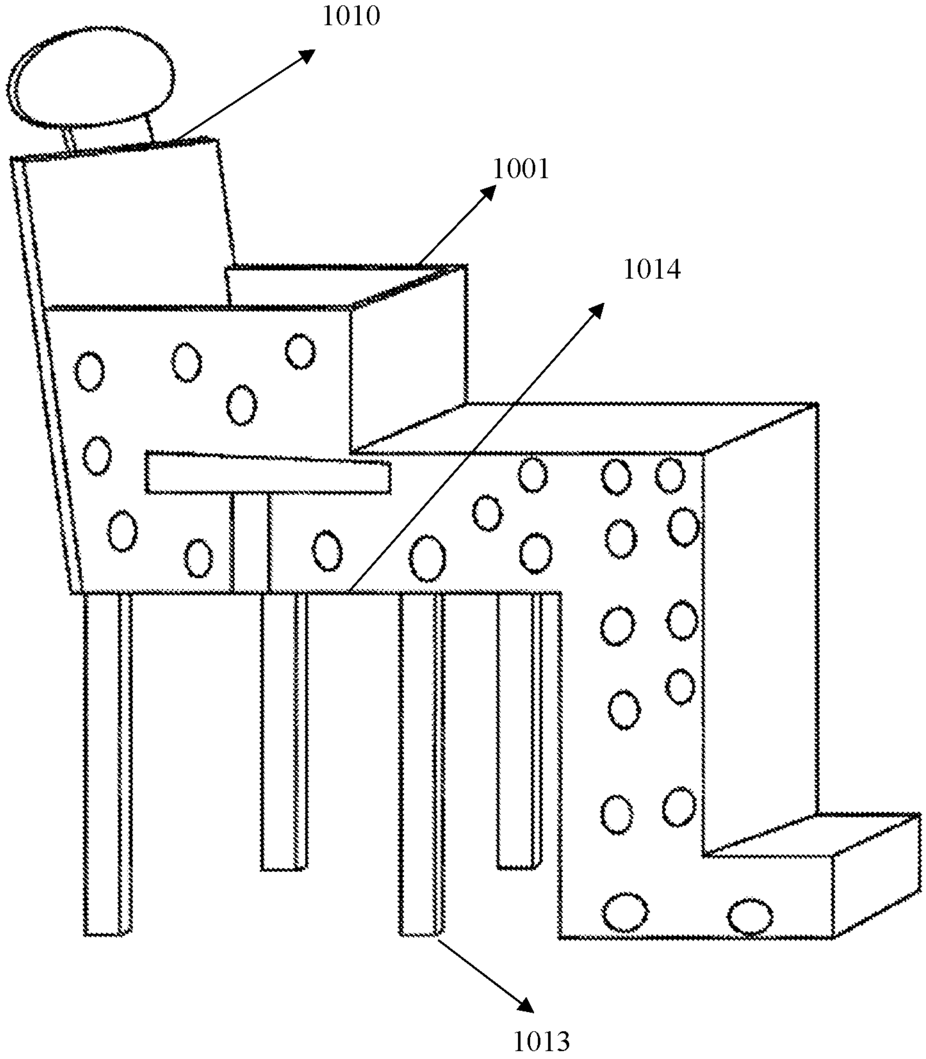
FIG. 1 is a schematic illustration of a chair, containing bladders filled with a substance (gas, liquid, solid or a combination thereof) exerting gradient of force on a patient with preeclampsia condition and redistribute weight from primary weight bearing regions to larger surface of the body.
Figure 2:
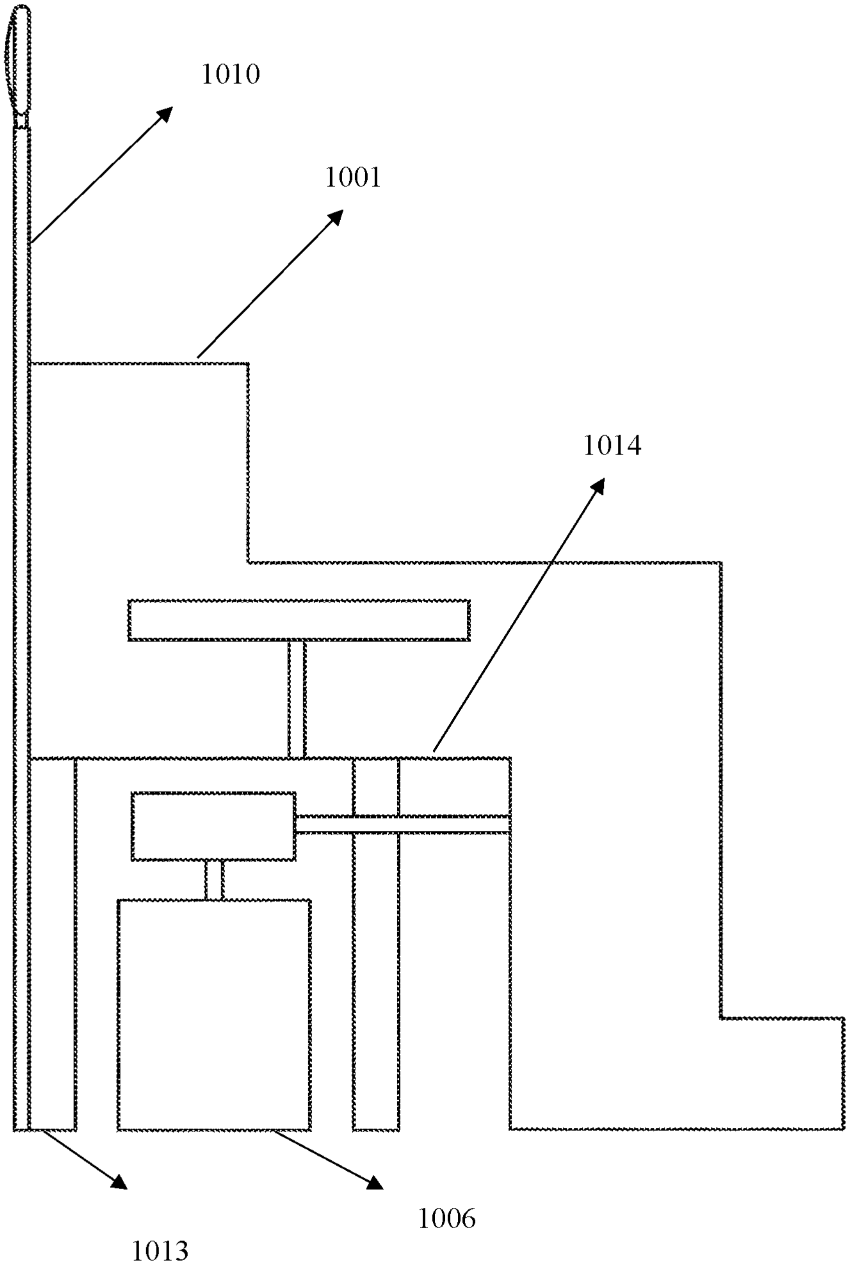
FIG. 2 is a side view of the chair of FIG. 1, showing a tank associated therewith.

These embodiments are listed here and described in detail below:

i) a chair or a seat type device (e.g., FIGS. 1 and 2, 3A-3C), ii) a lay-over portable device for placing on standard furniture such as a seat (e.g., FIG. 5), iii) a stretcher like device for carrying a patient that needs emergency medical care (e.g., FIGS. 6 and 7), iv) a vest like wearable device for exerting pressure on the abdomen or torso (e.g., FIG. 8), v) a wearable suit that can cover a specific portion of a body or the entire body (e.g., FIGS. 9, 10, 11 and 13), vi) an aquatic exercise cycle useful for exerting hydrostatic pressures on the body (e.g., FIG. 12) Reference is now made to FIGS. 1, 2, and 3A-3C which is a schematic illustration of a chair, constructed to operate in accordance with one embodiment of present invention. The embodiments shown in FIGS. 1 and 2 are similar to each other. The chair comprises a seat 1014 to support a pregnant person in a sitting position, and comprises of legs 1013, to support the seat in elevated position from the ground. A frame 1001, surrounds the seated person 1012 and forms a space around the person. The frame 1001 may comprise of doors (not shown in the figure) for easy entry and exit of the person, sensors 1005 to record several parameters including but not limited to pressure, temperature of the medium contained within the space, or physiological parameters such as blood pressure, heart rate, of the seated of the person and the fetus. A head-/back-rest 1010 attached to the seat or the frame provides support to the back of the seated person. At least one container 1002, which may be a bladder in some embodiments, designed to hold a substance which may be a gas, liquid, solid or a combination there of, in the space between the person and the frame 1001. In the preferred embodiment, the substance in the bladders may be a fluid (liquid or a mixture of liquid and solid) and hereafter will be referred to as fluid in this application. For descriptive purposes, the container 1002 will be referred to as "bladder" here after, although there is no limitation on form, and the "substance" will be referred to as "liquid" although the substance could be gas, liquid, solid or combination thereof in various embodiments. In some embodiments the substance could be water, salt solution of various densities, different liquids, balls, balls of various densities mixed with a liquid, powder, granular material, foam, solid material of various forms and the like. The gradient of pressure forces may also be exerted by various other forms including springs, rubber, plastic, non-metal or metal material. The bladder 1002 may contain fixed amount of fluid, or have at least one opening and connected via a tube to an external device such as a pump, fluid reservoir, that may be used to modify the pressure within the bladder. Additional tubes 1003 may be connected to the bladder to communicate with open air, for attaching sensors or for additional purposes. There is also no limitation on the number, and size of the bladders, type of material used for manufacturing the bladder, and various patterns that they can be arranged in the space around the person. Pressure in the bladder may also be modified by exerting external or internal pressure, such as moving panels, applying compressive forces, etc. The bladder 1002 may be filled or emptied via a tube 1009, which in turn may be connected to a pump 1007 or a tank 1006 via another tube 1008. The bladders may stay independent of each other or may be inter-connected to one another or to other tubes or spaces via connector 1015. The surface of the bladder may be clean without any attachments. In some embodiments, the surface of the bladder may contain structures 1016 such as rollers, bearings (e.g., transfer ball bearings), or elements that can stretch or slide when pressure is applied, lubricating material (e.g., lubricating liquid, materials with low friction, graphene balls), or a combination thereof, to facilitate smooth sliding of the bladders against each other, against the frame 1001, against the body surface of the person or any other structures that they come in to contact with. A hinge 1011 connects various panels, and allows for change of the size and shape of the chair, for example to allow the person to lean back completely, or to raise the feet. The panels may be moved using either manual or automated power systems such as a motor (not shown in the figure). The panels surrounding the feet and thighs may be taller to accommodate upward movement of the body in the seated position as appropriate. The bladders may be a series of long tubes stacked on the top of one another horizontally, or extend vertically from bottom to the top. In the embodiment shown in the figure, a fluid reservoir is included to modify the volume or pressure of the medium in the bladder. However, no limitations are implied for methods to perform this function.

Various means of modifying volume and the gradient pressure and redistribute weight from primary weight bearing regions to larger surface of the body may be used, including raising and lowering the reservoir, pressurizing with a bidirectional pump, mechanically compressing the bladders, and the like. The term 'pressure' denotes force per unit area, and indicates how concentrated a force is on a surface, while the 'force' has both magnitude and direction. In this application, the pressure and force are used interchangeably when describing the gradient of pressure or gradient of forces for ease of description, and may also be used together as "pressure force". The terms "pressure," "force," or "pressure force," are used, in general, used to describe forces that are somewhat similar to "hydrostatic forces" experienced by a person when immersed in water.

Figure 3A:
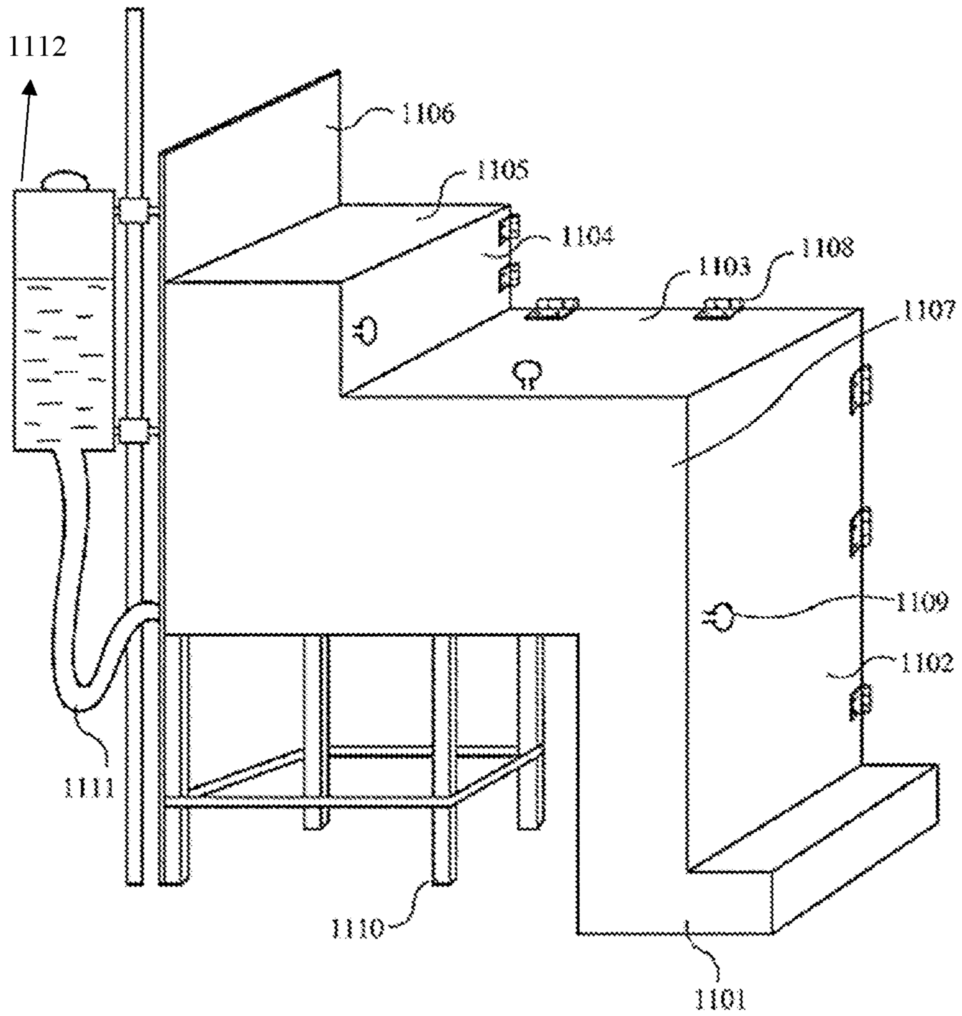
FIG. 3A is a perspective view of the chair, showing a fluid-filled tank, front and top panels and doors for entry and exit of the user.
Figure 3B:
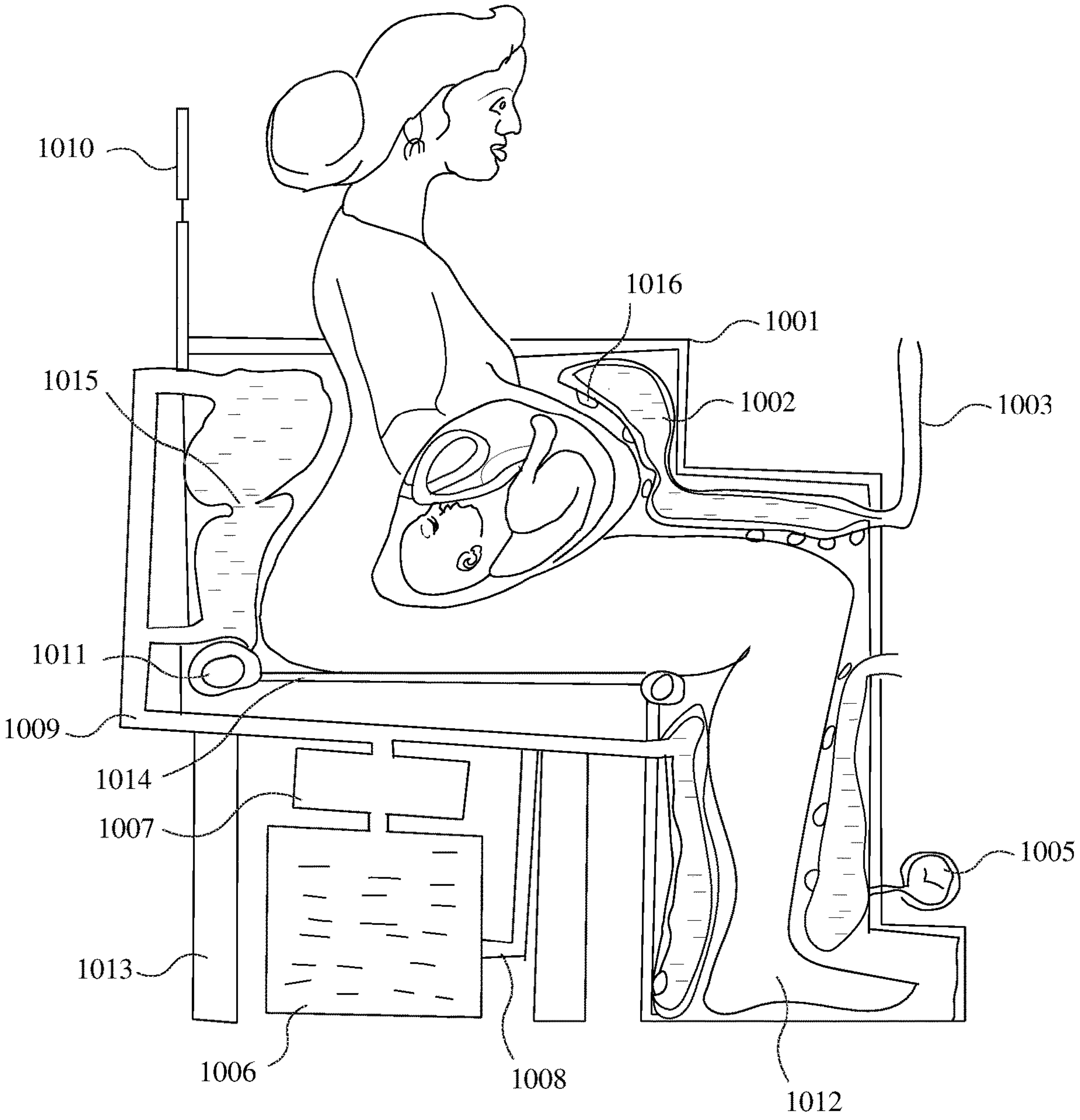
FIG. 3B is a schematic illustration of a chair, containing bladders filled with a substance (gas, liquid, solid or a combination thereof) exerting gradient of force on a patient with preeclampsia condition and redistribute weight from primary weight bearing regions to larger surface of the body.

As shown in the perspective view of the chair in FIG. 3A, for example a frame 1107 that surrounds a space to accommodate, e.g., a pregnant person. The frame may be constructed out of a variety of materials, and without any limitation, may comprise of panels, posts, beams, fabric, etc. The function of the frame is to enclose a space and provide support to various structures including the person seated in the space, and will be referred to here in this application as "frame". Additionally, the frame supports the weight of the medium as well as the weight of the person in the chair. In some embodiments, the frame may comprise of non-stretchable fabric, with openings for inserting tubes, pipes or rods that can connect to each other to support the fabric and form the desired shape. The frame 1107 comprises of a back panel 1006 to support various bladders, cushions that contact back of the head, neck and/or torso of the seated person, a vertical panel 1104 that covers the front portion of the torso, a horizontal panel 1103 that covers the thighs, and another vertical panel 1102 which covers the lower parts of the legs and the feet. Hinges 1108 and knobs 1109 help easy opening of the above doors/panels for the person to enter or exit the chair. The chair is supported by the supporting posts 1110 that stand on the floor.

When seated, the head and the torso of the person is positioned at the opening 1105 in the frame. A tank 1112, designed to hold the medium and is connected by a tube 1111 to the bladders surrounding the seated person. The height of the tank 1112 can be raised or lowered in relation to the chair to fill or empty the bladders, or vary the pressure on the body of the person, while seated in the chair. As the bladders are present around the body, including feet, a gradient of pressure will be exerted on the seated person from toes to the upper extent of the bladders. It should be noted that as the bladders are attached to the panels and the frame and are designed to stay within the space, even when excessive pressure is applied on them. The tube may be connected to the bladders at the lowest point in the chair, for easy filling or draining of the bladder via the same tube. It should be noted that the frame 1107, various panes (1006, 1104, 1103, 1102, etc.,), the supporting posts 1110, and the bladders (not shown in FIG. 2), are shown as separate parts in several of the diagrams in several of the figures and described as such in this application. However, it should be noted that there is no limitation on their form and that they may be modified to serve more than one function. For example, in some instances, the panels may serve the function of the frame, and there may not be a separate frame. In other instances, for example, a frame is present, but the panels may be a fabric, which together with the frame forms chair that supports the fluid-filled bladders and the person. In additional embodiments, the bladders may be modified to integrate the function of frame and the panels (e.g., with non-expandable and rigid outward facing layers and flexible/stretchable inward facing layer that expands when filled with fluid) to support the person.

To operate device, the pregnant person enters the chair and sits on the seat and secures all the panels. Then the bladders are filled by raising the tank, so that the medium exerts a gradient of hydrostatic pressure on the seated person and results in redistribution of weight from primary weight bearing regions to larger surface of the body. The resulting gradient of pressure on the lower extremities of the pregnant person, leads to increased pressure on the interstitial fluid on the submerged portions of the body. Normally, in a person standing upright, there is a natural positive pressure gradient with higher hydrostatic pressure in the arteries and the arterioles and the capillaries compared to the interstitial space. Application of the gradient of external pressure forces accompanied by redistribution of weight leads to a negative pressure gradient with higher pressure in the interstitial space, relative to the intravascular space, leading to fluid shift from extravascular compartment into the vascular system of the lower extremities, and further into the central compartment/intravascular compartment. The central compartment as defined herein includes total blood and fluid volume in at least the abdominal, pelvic, and chest cavities, and the organs contained therein. The blood/fluid contained within the intravascular and/or extravascular space in the dependent portions of the body is also shifted to the central compartment as it is under a gradient of pressure exerted on the body as well as due to redistribution of weight. It may also further be shifted towards head; for example, when a person is lying down, as described in the later embodiments, it will do the same, for the blood and tissue fluid on the underside of the person, is pushed into central compartment, and possibly towards the head. The increased central volume in pregnant woman leads to in increased amniotic fluid volume in the uterus resulting in reduced distress to the mother and the baby. Further, in pregnant women with hypertension or edema, the increased central volume also results in decreased renal sympathetic tone, increased blood circulation to the kidney, decreased water resorption in the distal convoluted tubules and increased diuresis without the need for using anti-diuretics. Fluids of various densities may be used in the bladders to exert a gradient of pressure forces on the body of the person and redistribute weight from primary weight bearing regions to larger surface of the body, in which the vector of such forces act always in the direction opposite of the gravitational forces on the body. Therefore, regardless of the posture of the person in the chair whether seated or leaning back, the gradient of pressure forces exert pressure on the body in an upward direction, contributing to a net upward shift of fluid from dependent portions of the body. The system also reduces the total peripheral resistance by reducing the load on the body. To exit the chair, the bladders are emptied first by lowering the height of the tank and then panels are opened.

Figure 3C:
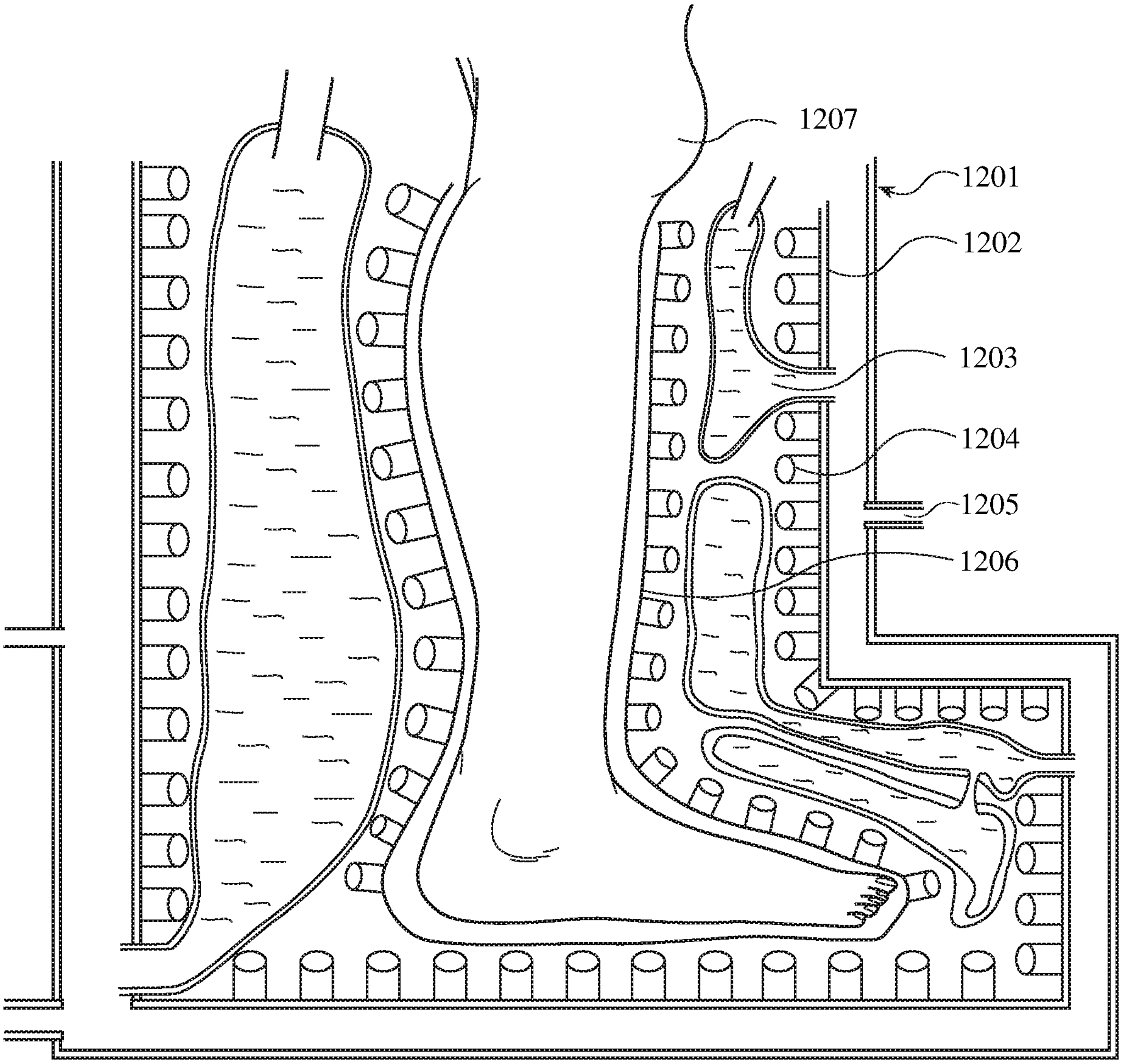
FIG. 3C is vertical cross-section of a portion of the chair showing the leg of a person of FIG. 3B surrounded by bladders containing substance (gas, liquid, solid or a combination thereof) and the frame, with roller/ball bearing like structures to minimize frictional forces.

FIG. 3C shows a detailed view of a portion of the chair around the leg of a patient, designed to reduce the friction between the body and the bladders holding the medium. Shown in the figure is a bladder 1203 exerting pressure on the leg 1207 of a person seated in the chair. The frame contains two layers of panels, an inner 1202 and an outer 1201 panel; the panels enclose a space in between them and holds medium, and is in communication with the bladders as well as fluid reservoir via a tube 1205 (note the fluid reservoir not shown). The leg may be covered with sheet 1206, to which various structures 1204 (e.g., transfer ball bearings) may be fixed to reduce the friction between the surface of the leg and the bladders 1203. The structures 1204 without limitation, may be rollers, ball bearings, stretchable material, lubricating material, movable patches or strips, or other structures intended to minimize the friction between the body surface and the bladder containing the medium. The structures 1204 will be referred to as "ball bearings", here after. The ball bearings 1204 may also be located on the inner wall of the frame 1202, or on the bladders (not shown in the figure). The presence of ball bearings 1204 allow for the bladders 1203 to exert a gradient of pressure on the body of the person, while allowing the easy movement of the bladders against the body surface. Minimizing friction helps in easy movement of the bladder along the skin and exert the gradient of force and redistribute weight from primary weight bearing regions to larger surface of the body, without undue compression at unintended locations of the body. Minimal friction also allows for increased comfort of the user. Other means of reducing friction include, but not limited to, lubricating material such as an oil applied between various parts, stretchable fabric, springs or rubber or other type of material that can expand and contract, which are designed to maintain constant contact with the body to minimize relative movement.

In accordance with another embodiment of a chair, rollers/transfer bearing type devices may be placed between the body surface and the bladder to exert a gradient of pressure on the body while minimizing friction. For example, such a chair may be similar to the embodiment shown in FIG. 1, and further including a supporting frame, bladders connected to the fluid reservoir, movable panels that are enabled to exert pressure on the body of the person while allowing the person to easily enter and exit the chair. The bladders are configured to cover at least some portions of the body, for example legs and torso and exert pressure when filled with the fluid. The bladders may be supported by panels on the outer side by a glue or anchor, which limit outward expansion of bladders. The inner side of the bladders may press against a sheet comprising of rollers or transfer ball bearings, or other means that easily slide over the bladder with minimal friction. Here after this sheet will be referred to as "sheet of transfer ball bearings." The sheet of transfer ball bearings, is positioned between the body of the user and the bladder. When the bladder is filled with fluid, the bladder is enabled to expand on the side facing the sheet of transfer ball bearings, which in turn exert a gradient of pressure on body surface of the person that they come into contact and redistribute weight from primary weight bearing regions to larger surface of the body. As the ball bearings easily roll against the body surface of the user, only a minimal friction will be experienced by the user when the bladders expand. Minimizing the friction between the rollers and the bladder is very critical for the functioning of the device, since it avoids irregular stretching of the skin and underlying structures and minimizes shear forces that in turn can damage the tissue, and reduce tolerance to the external applied pressure. It should be noted that although the fluid-filled bladders are mentioned in this application as a means to exert gradient of pressure and redistribute weight from primary weight bearing regions to larger surface of the body, it is by no means intended to be limiting. A gradient of pressure on skin can be for example exerted by several means, including mechanical compression using a series of horizontal or vertical strips each of which can exert different amount of pressure.

The back panel may be rigid or semi-flexible and supports the outer surface of the bladder, which is attached to the back panel by means of anchors or other means (e.g., Velcro, glue, etc.). A sheet of rollers, containing a several independent rollers or transfer ball bearings (see FIG. 9B), covers the inner surface of the bladder. Individual rollers on the sheet are held together by threads or other anchoring means to maintain the orientation. When the bladder is filled with the fluid, the rollers are pressed against the body surface of the user. Due to the gravitational force, and weight of the liquid, the bladder may exert higher pressure on the bottom rollers compared to the top rollers, with the pressure on the rollers in between the top and the bottom rollers changing gradually. Because of the rollers, the bladder in the process of being filled moves over the body surface of the user, smoothly without causing any friction.

Individual rollers may be held together in a sheet of rollers to minimize friction. A roller is held in between the arms of a bracket, for example. A soft foam or a cushion backing may attach the bracket to the roller sheet. When pressure is applied on the roller by the body surface or the bladder, depending on the orientation of the roller, that pressure is transmitted to the cushion and in turn to the body surface or the bladder.

Figure 4A:
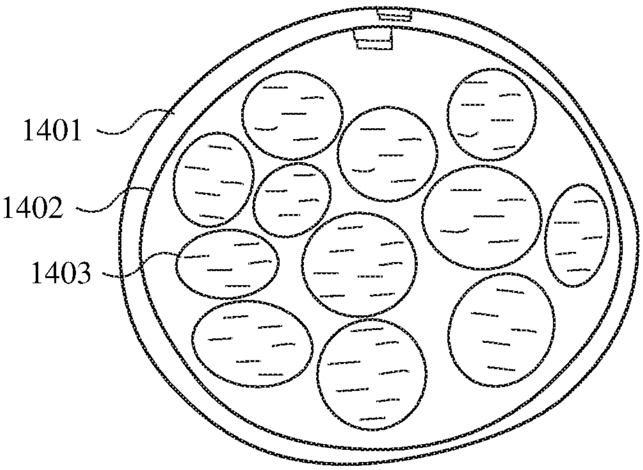
FIGS. 4A,4B, 4C and 4D illustrate various embodiments of bladders holding a substance, with various structures on the surface to minimize friction.
Figure 4B:
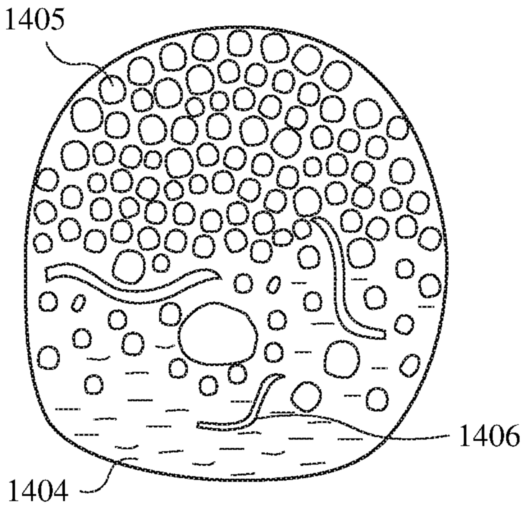
Figure 4C:
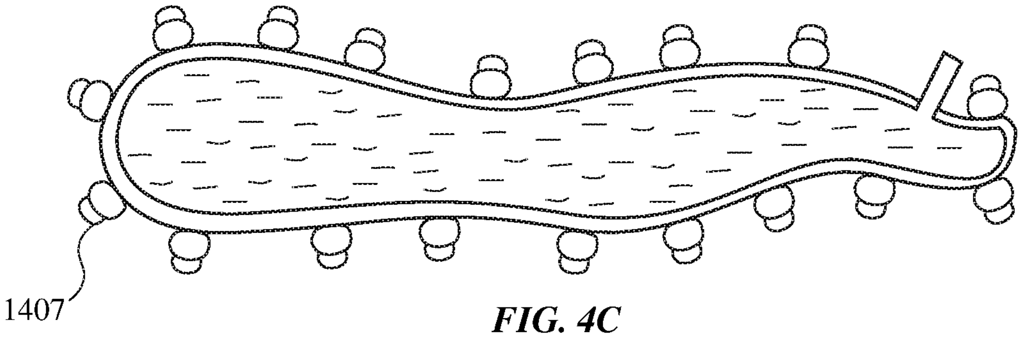
Figure 4D:
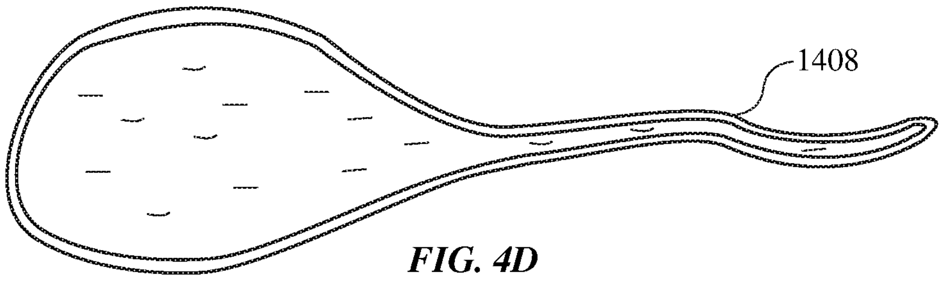

FIGS. 4A, 4B, 4C and 4D show examples of additional embodiments of the bladder. FIG. 4A describes a bladder that comprises of at least one outer layer 1401 made of material that is flexible, semi-rigid, or a combination thereof. The bladder may be inflatable or made of material that is resistant to expansion and filled with medium (gas, liquid, solid, foam or a combination thereof). The bladder as shown in FIG. 4A may have one compartment. The bladder may also contain smaller bladders 1403 within in the outer and/or inner layer 1402, and are enabled to move around inside of the larger bladder with minimal friction. As shown in FIG. 4B, the bladder may be filled with fluid 1404, or solid material of different shapes and densities 1405 and 1406 or a combination thereof. FIG. 4C shows an embodiment of bladder with ball bearing like structures 1407, on the surface, to minimize friction against any contacting surfaces.

There is no limitation of the shape or size of the bladder. As an example, in FIG. 4D, the bladder contains a fluid filled portion and an empty end 1408, which may get filled with fluid when the pressure is applied on the liquid-filled end.

Various embodiments of the devices shown in the FIGS. 1 to 4 can also be used for redistribution of fluids among various compartments in the body, to facilitate efficient and safe hemodialysis in patients. In patients undergoing hemodialysis, the dialysate equilibrates with the intravascular fluid. However, this process can be slow and therefore, can take up to 4 hours or more to complete the dialysis. The Either the chair type of device described in FIGS. 1 to 4, or the suit described later in the application, may therefore, be used to rapidly move the extravascular fluid especially from the lower extremities (interstitial as well as some intracellular fluid) into the intravascular space and into the central compartment and making it available for rapid equilibration. In order to accomplish this, the patient that requires dialysis is seated in the above chair and dialysis is initiated. A pressure gradient is applied from toes towards the head for a specified period to facilitate rostral shift of the fluid from the extravascular space. Simultaneous redistribution of weight from primary weight bearing regions decreases the sympathetic tone. After some period, the pressure in the bladders may be released, and the whole process may be repeated as needed. The device is likely particularly helpful in management of intradialytical hypotention that occurs as a result of fluid and electrolyte imbalance and in addition to other factors that occur during dialysis. Conducting dialysis while positioned in the device, will help with management of the fluid load and resulting hypotension.

The devices shown in FIGS. 1 to 4 and the suit described in this application may also be used to increase urinary output without the use of diuretic drugs, essentially acts as a non-pharmacological diuretic. This is important, as some patients may not tolerate diuretics or become resistant to diuretics. Fluid from the body can be removed safety to manage various conditions that result in accumulation of fluid in the interstitial space, especially in the lower extremities. These include but not limited to edema, ascites, congestive heart failure, hypertension, lymphedema, sleep apnea and the like. For inducing diuresis, the patient is seated in the chair and a gradient of hydrostatic pressure is applied from toes towards the head. The external hydrostatic pressure leads to shifting of the extravascular fluid into the intravascular space and off-loading of the weight on to the supporting frame and reduced sympathetic tone. The increased central volume reduces renal sympathetic tone leading increased urinary output. Further, increased hydrostatic pressure causes the reduced sympathetic tone leading to decreased total peripheral resistance the reduced renin-angiotensin-system activity, and reduced fluid volume further reduces the overall load on the heart in case of heart failure. In patients with sleep apnea, rostral fluid shift during the night when the patient lies down causes obstructive sleep apnea. Reduction of the fluid volume using either the chair or the suit device prior to the patient going to bed is expected to decrease overall fluid load and potentially reduces the severity of sleep apnea. In case of lymphedema patients, application of external gradient of pressure force on the body and off-loading of the body weight leads to shift of the fluid from interstitial space back into vascular space through capillaries, thereby decreasing amount of fluid in the interstitial space that usually need to be emptied by lymphatic route. In case of obstruction of lymphatic vessels or removal of lymph nodes as in breast cancer patients, the system and the method helps reducing the swelling of the extremities by removing the fluid through capillaries, instead of the lymphatic system.

Figure 5:
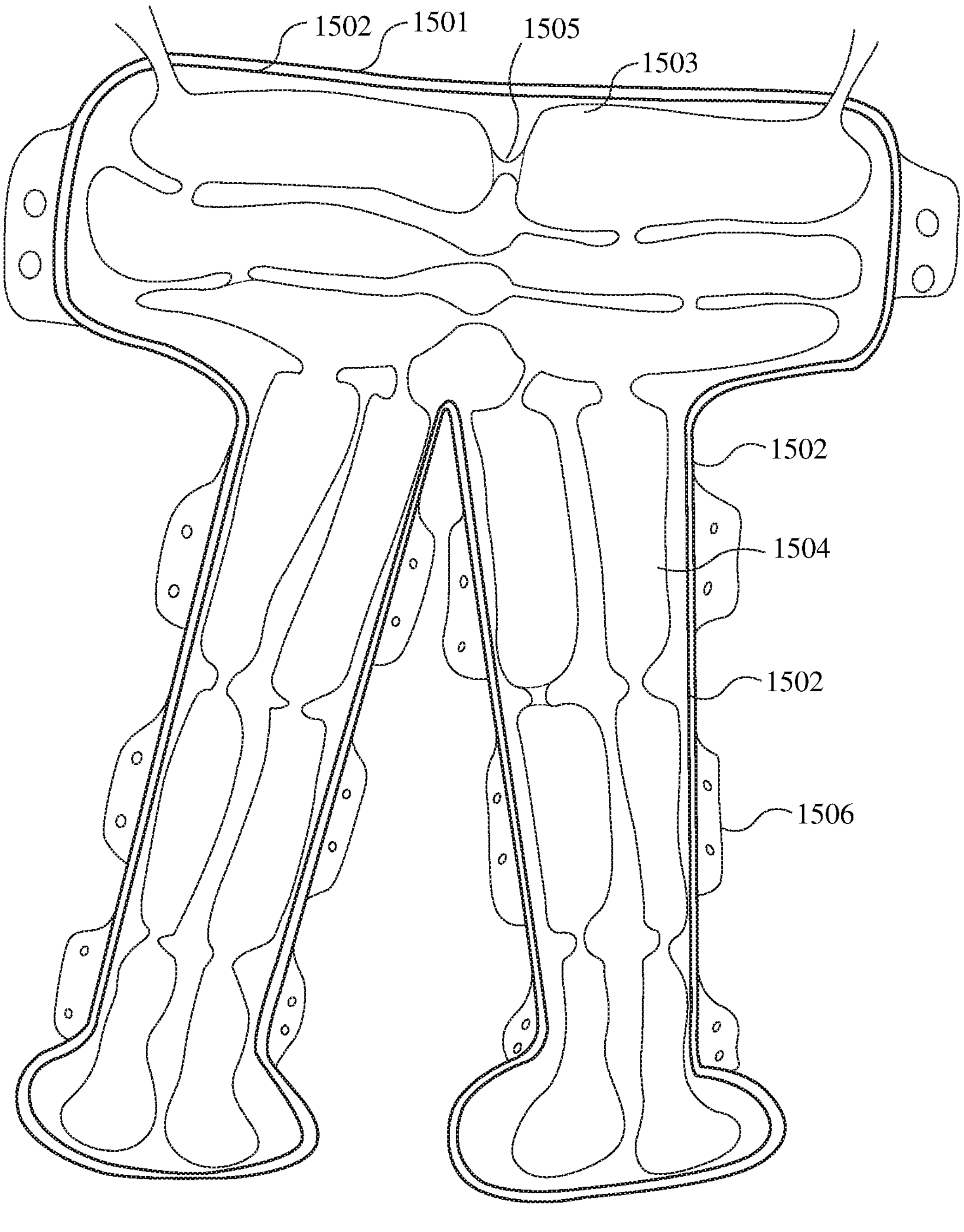
FIG. 5 is a spread-out view of the inner side of a portable lay-over embodiment containing bladders holding medium, outer frame and fabric layer useful for placement on furniture such as a chair, to exert gradient of pressure on the body and redistribute weight from primary weight bearing regions to larger surface of the body.

FIG. 5 describes a portable embodiment of the device that can be used as a lay-over cushion on any standard chair, to exert a gradient of pressure on a person and redistribute weight from primary weight bearing regions to larger surface of the body using the same principles described. The device can be secured to on top of any existing chair, seat or a bed like an over-the-top pillow or cushion, and then the edges are wrapped around the body of the user like suite, and the bladders filled using fluid from the reservoir so as to exert a gradient of pressure on the user's body and redistribute weight from primary weight bearing regions to larger surface of the body. FIG. 5 shows a view from the front side, when the device is opened, showing the bladders on the inner layer. The device comprises of a flexible but strong outer layer 1501 and supporting rods or tubes 1502 that are part of the frame, that run through and anchor the outer layer at various locations. When assembled, the frame and the outer layer together surround the person seated on the chair and form a space, within which the bladders 1503 and 1504 containing medium exert pressure when filled with medium. Hinges may be present in the frame at appropriate locations corresponding to flexible joints of the body, for flexibility and for ease of assembly and disassembly. The frame is designed to be sturdy enough to support the weight of the person using the device. The bladders 1503 and 1504 may stay independent and have fixed amount of fluid, or may be inter-connected, and connected to at least one external fluid reservoir or a pump through various tubes 1505. Note that the reservoirs or pumps are not shown in the figure. The bladders may be filled with fluid up to a pre-specified size, and their expansion may also be restricted by the outer layer 1501 when filled with the medium. To operate the device, it is secured to the desired support such as a chair first, and then the user sits on the opened device, and wraps the outer layer 1501 and frame 1502 around one's body to form a space. When the fluid is pumped into the bladders from the reservoirs, the resulting hydrostatic pressure from the fluid, exerts a gradient of pressure on the body and redistribute weight from primary weight bearing regions to larger surface of the body. As the outer layer 1501, limits the outward expansion of the bladders, the pressure is directed against the body of the person. This leads to off-loading of the pressure from the weight bearing regions of the body and providing a buoyant effect on the body.

Figure 6:
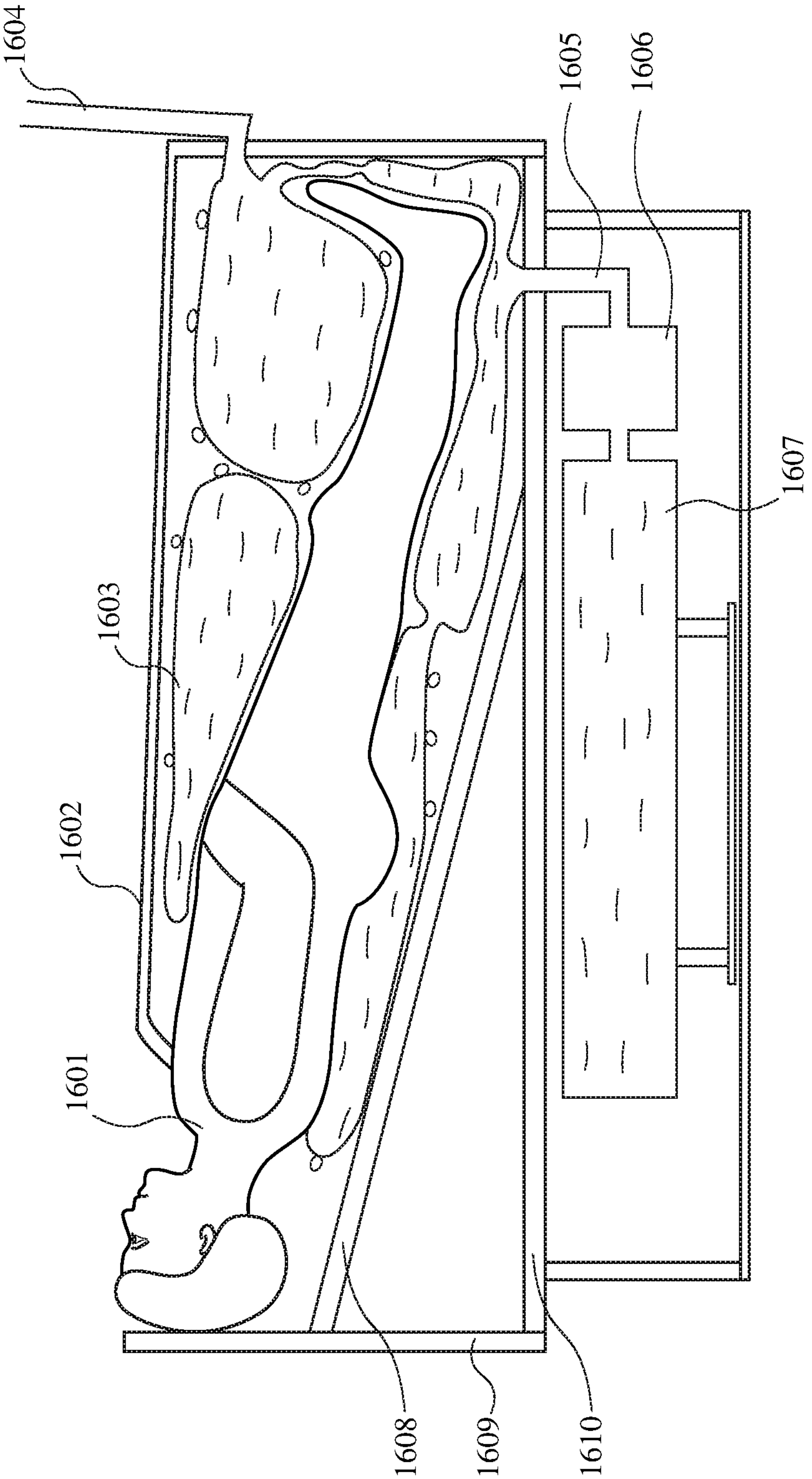
FIG. 6 is a longitudinal sectional view of an embodiment of a portable stretcher to carry patient, along with bladders containing medium, a reservoir with fluid, and foldable frame with fabric layer.
Figure 7:
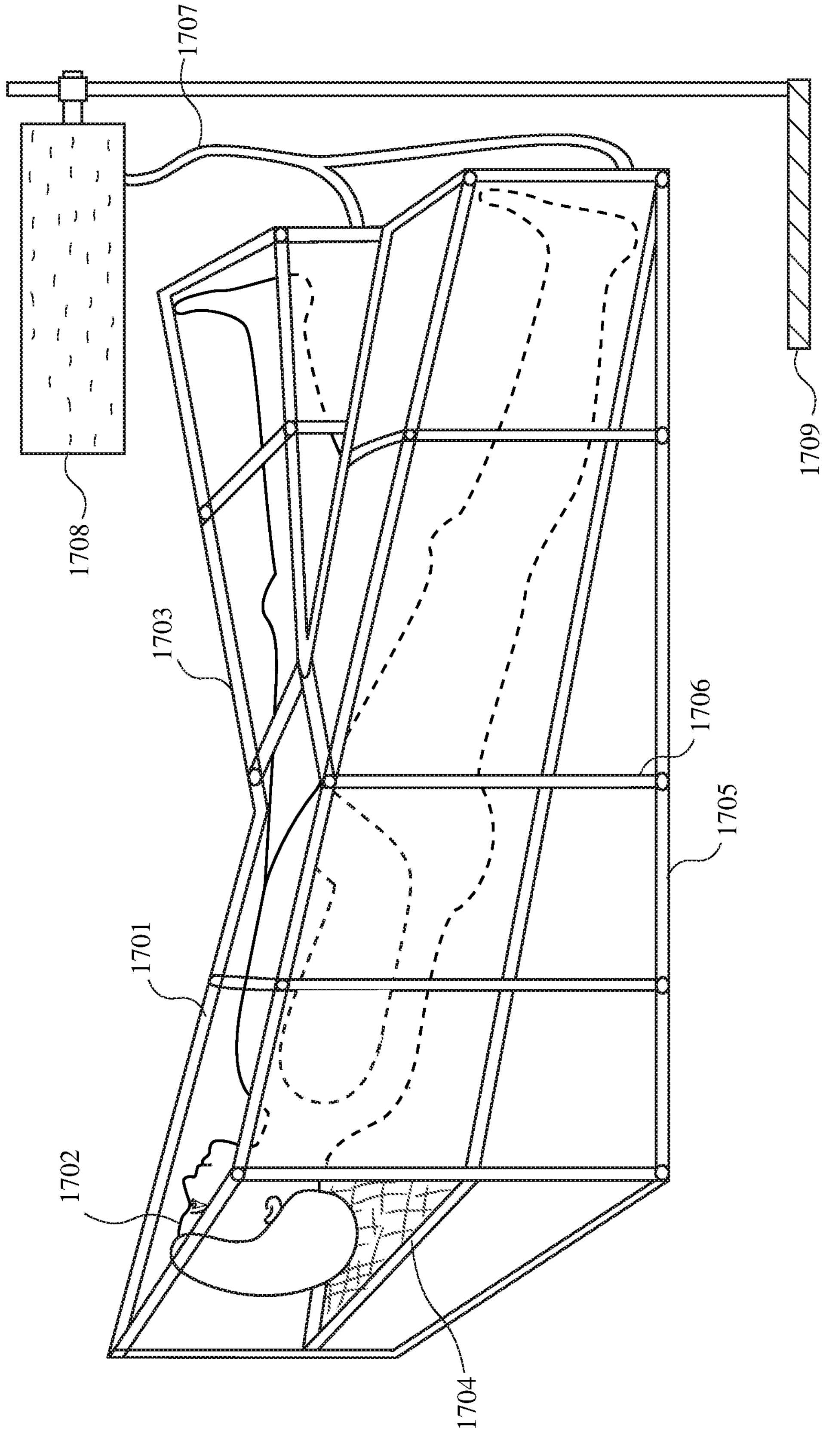
FIG. 7 is a perspective view of an embodiment of a portable stretcher shown in FIG. 6.

FIGS. 6 and 7 show a longitudinal sectional and a perspective views of a stretcher type of device, for potential use in the medical emergencies. In FIG. 6, the outer layer 1602 forms the outer boundary of the device, supported by horizontal 1610 and vertical sections of the frame 1609 to form a space around the body of the person 1601. A portion of the frame 1608 can be raised to lift head, neck or other parts above rest of the body. Bladders 1603 are connected to the reservoir 1607, or to the pump 1606, to empty or fill up the bladder and increase or decrease the pressure. The bladders may be open to the air via a tube 1604 or closed as appropriately to adjust pressure. In FIG. 7, a perspective view of the device is shown, with the side panels 1701 and 1703, the bottom panel 1705 forms a space around the body of the person 1702. The side panels may be reinforced by supporting structures 1706. A base panel 1704 may be used to raise selected portions of the body above the rest as needed. A fluid reservoir 1708, supported by stand 1709 is connected to the bladders (not shown) via a connector tube, and the reservoir can be raised or lowered to either fill or drain the bladders and modify the pressure in the bladders that surround the person. Additional embodiments of the device may comprise of beams with hinges, that support non-elastic outer sheet, which is light weight and easy to carry, together when assembled form a space to accommodate the bladders and the person.

The above device is operated by first assembling the outer layers/outer panels, and placing the person in supine position in the device, and the head may be slightly elevated. The bladders are then filled with the medium, thereby exerting a gradient of pressure from posterior to anterior side of the person as well as from toes towards head and redistribution of weight from primary weight bearing regions to larger surface of the body, which results in increased shift of the fluid to the central compartment. Additional rationale for use of the device is described below: A person placed in a supine position experiences a gradient of pressure on various fluids in the body, including the blood, intra-cellular and interstitial fluids; the pressure is higher on the back (lower side), back of thighs and calves, while the pressure on the anterior aspect (the upper side) of the abdomen, thighs and rest of the legs may be relatively lower. In a healthy person, due to activity of autonomic nervous system, adequate perfusion is maintained to all portions of the body, and especially to the critical organs, regardless of the position in healthy individual. In patients that experience clinical shock for various reasons, including but not limited to cardiogenic, neurogenic, anaphylactic, hemorrhagic, septicemic, etc., the pressure in the blood vessels may not be adequate to maintain pressure to the critical organs. In situations, such as anaphylactic or septicemic shock, the blood may pool in the dependent portions of the body, including in various regions of splanchnic circulation. Currently, there are no effective non-pharmacological options to reverse this situation.

Therefore, the device described in the FIGS. 6 and 7, as well various other embodiments based on the principles described in this application may be used to increase the central volume in such patients, and increase perfusion to various critical organs. Further, decreased peripheral resistance in the dependent tissue following application of a gradient of pressure, accompanied by a redistribution of the body weight, will further decrease the load on the heart, and increase perfusion of the various tissues due to dilation of capillaries leading to increased microcirculation to the tissue.

Additional uses of the device include but not limited, to management compartment syndrome in humans, in which the fluid pressure in a compartment (e.g., abdominal cavity) is abnormally elevated. In such patients, the device exerts a gradient of hydrostatic pressure on the surface of the abdomen of the patient, thereby providing a counter force to excess accumulation of fluids in the abdominal cavity of the patients. The pressure exerted on the abdomen by the bladders can be optimized, based on the internal abdominal pressure.

Figure 8:
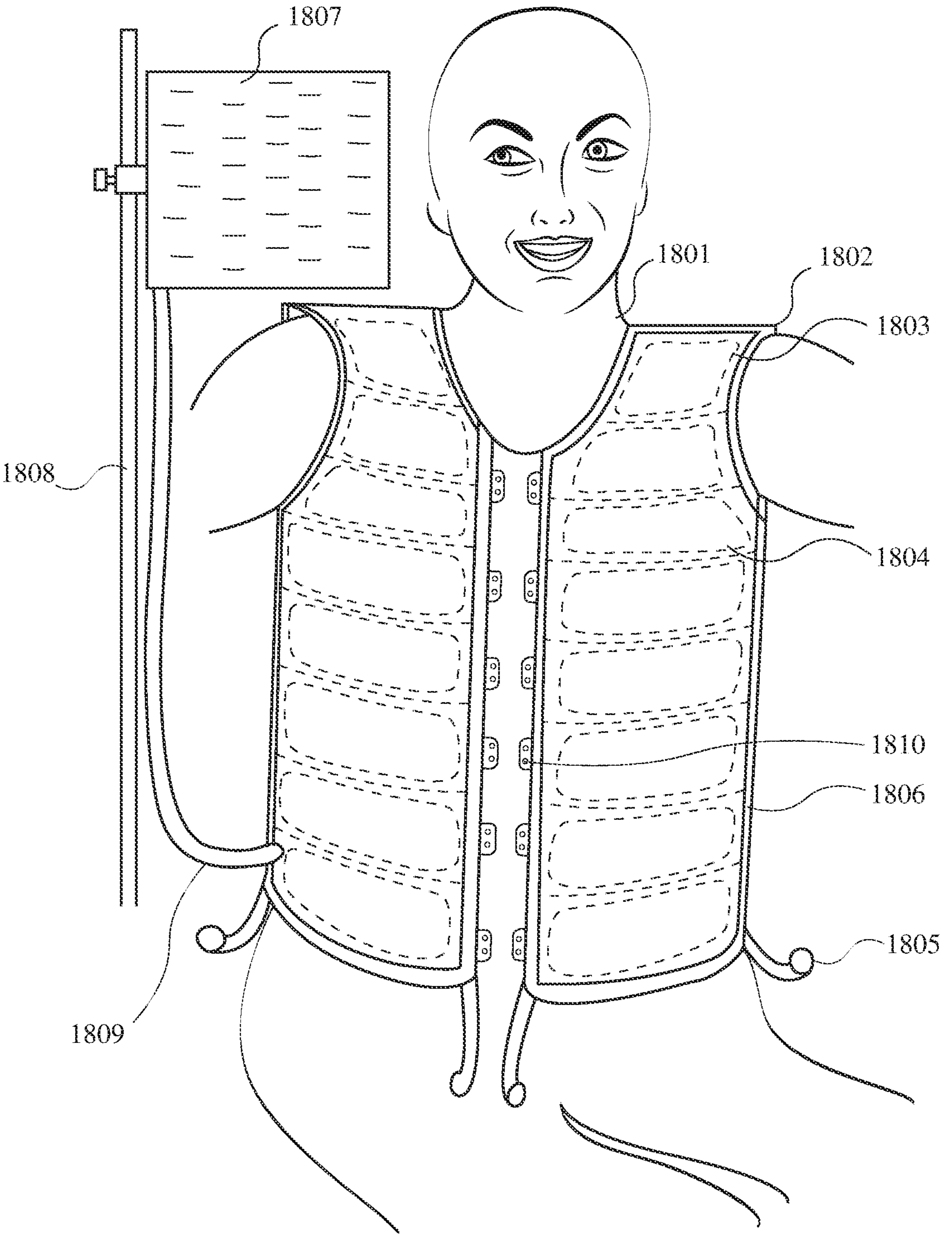
FIG. 8 is an embodiment of a jacket with bladders containing medium, frame with supports to off-load the weight of the torso onto the seat of the chair.

FIG. 8 shows an embodiment of wearable vest type device that exerts a gradient of pressure on the torso of the user, while redistributing the load of the torso on the primary weight-bearing regions (e.g., lower back, sacrum and coccyx). The vest may be used independently or as part of a suit or the chair. The vest comprises of an outer layer, supporting frame and bladders. The vest may cover the whole torso (all four sides front, back, and two sides) or only a portion of the torso (e.g., abdomen). Bladders may be selectively filled to exert pressure on desired locations on the torso, for example on the abdomen or on the back only. One of the objectives of the vest is to exert pressure on the abdomen and splanchnic circulation, for potential applications in various human conditions. Although, a vest is shown, other embodiment of the device may include but not limited to a sheet that wraps around the torso on the abdominal region or like an abdominal binder with appropriate modifications described. The device comprises of an outer layer 1803 and a frame comprising supporting tubes or rods 1802 and 1806 and bladders 1804. The frame together with the outer layer 1803 wraps around the user 1801. The vest is secured to the torso of the user 1801, using a zipper, Velcro or similar means 1810. The frame 1802 is connected to supports 1805, which rest on the seat of a chair when the person wearing the device is seated. These supports 1805 bear majority weight of the device and the person, when the bladders are pressurized. When the user is in an upright standing position, the frame (comprising of rods 1802 and 1806) may be connected to longer supporting structures (not shown) that may extend up to the floor (instead of resting on the seat of the chair), to transfer the weight onto the floor. The bladders may contain either fixed amount of fluid or may be connected to external fluid reservoir 1807 (or a pump) via a connecting tube 1809, to modify the pressure in the bladder.

The vest type device shown in FIG. 8 is operated preferably while seated. The user secures the device to the body with its supporting legs 1805 resting on the seat of the chair. The bladders are then filled to exert a gradient of pressure on torso and redistribute the weight. The amount of pressure applied and the area of the application of the pressure require optimization based on the purpose. It should be noted that significantly higher pressure applied to the torso may result in increased pressure on the abdominal vessels compared to the legs, which can lead to decreased venous return to the heart and may have adverse effect. Similarly, pressure on the chest will lead to added strain on the respiratory system. Therefore, area where the pressure is applied and the amount and duration of pressure applied need to be optimized for individual use.

One of the potential applications of the device is to exert a hydrostatic pressure gradient on the splanchnic vascular system to raise systemic blood pressure, with a goal of preventing orthostatic hypotension, or transient systemic/intracranial hypotension observed in people prone to motion sickness. Efforts to raise blood pressure using g-suit or abdominal binders in such patients met with limited success, as these devices do not exert a pressure gradient and redistribute the weight, resulting in uneven or uniform pressure which will not lead to a desired effect. Some potential additional application of the above embodiment of the device include, without limitation, treatment of migraine, nausea and vomiting from various causes, preventing motion sickness due to use of virtual reality or augmented reality applications, management of abdominal compartment syndrome, fluid resuscitation, cirrhotic ascites, and the like.

Figure 9B:
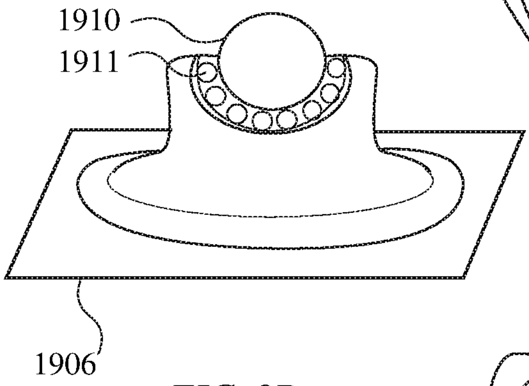
FIGS. 9A and 9B depicts a portion of the wearable suit with leg of the user covered with outer frame, bladders containing medium, and ball bearing like structures to minimize friction between the bladders and the skin of the person.
Figure 9A:
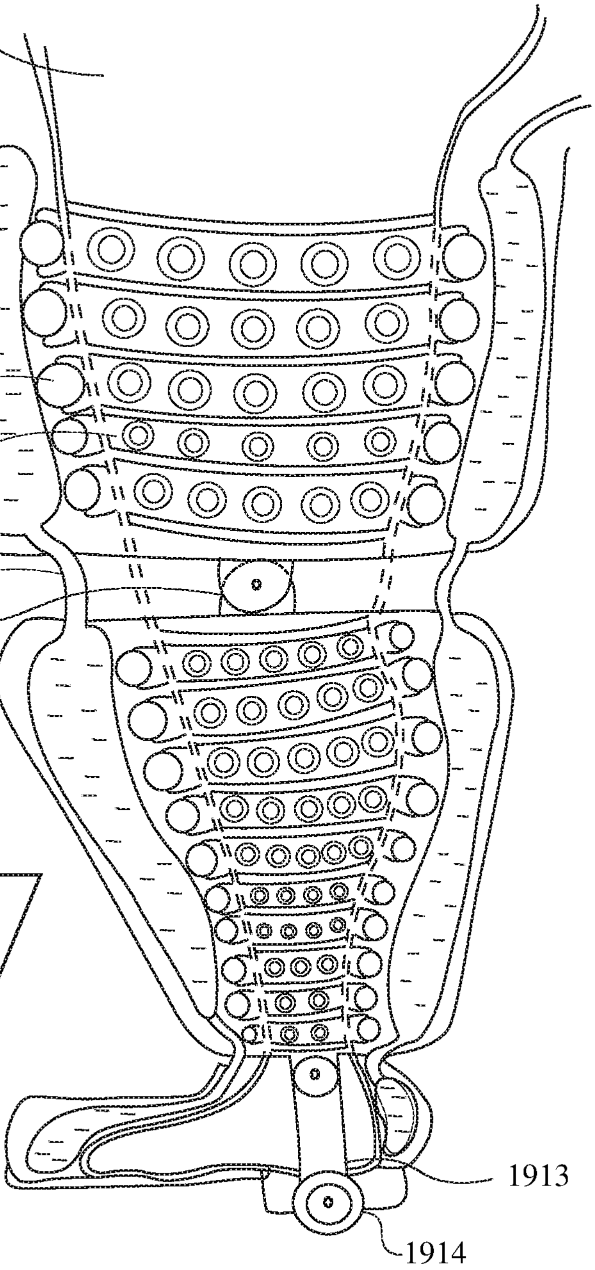

FIGS. 9A and 9B describe a leg support, which can be part of a suit that covers a significant portion of the body. The leg 1901 is surrounded by an outer shell/frame 1904, which encloses a space around the leg. The frame may be comprised of beams, tubes, rods and the like or a rigid or a semi-flexible material to support the weight of the person and pressure from the bladders 1903 within. The frame may have joints at several locations for flexibility (e.g., waist, knee and ankle joint) and rest on either the floor, in the shoes or in a wheel. To minimize friction among the bladders, leg and the frame several approaches can be taken. For example, the relative movement of the bladder against the skin can be minimized by closely fitting an inner layer of bladder(s) to the leg. Balls, ball bearings, rollers and the like may as well be used to minimize friction. A ball bearings 1905, may be fixed to strips 1906, that are configured to fit the contours of the leg, and placed in a desired orientation. The bladder when filled with the liquid exerts pressure on the ball bearing and in turn on the strip 1906 and on the leg. Due to the presence of the ball bearing the bladder can move upwards or downwards, without exerting any shear forces or friction on the skin of the person. It should be noted that ball bearings can be placed at different locations, including next to the skin as shown in the figure, inner or outer side of the bladder or on the inner side of the frame to minimize friction. The bladder 1903, is connected to external fluid reservoir through tube 1902 and contained by the outer shell 1904, which limits the outward expansion of the bladder, thereby forcing the bladder to exert pressure on the ball bearings 1905 on the leg. The bladders from the lower portion of the leg may be connected to other bladders through tubes 1907, to allow for the fluid to move from one bladder or to the reservoir to eliminate potential excess pressure on any single location. When the bladders are filled with the medium, they push the body up against gravity, resulting in at least a portion of the weight of the body off-loaded (from primary weight bearing regions) on to the frame 1904, which in turn, transfers the weight onto the floor. This leads to reduced pressure on various body parts such as underside of the thighs, buttocks and feet. The frame 1904 is connected to a shaft 1913, which in turn either rests on the floor or attached to the user's shoe, or a wheel to off load the weight of the person. There is no limitation on the number of or form of the shafts used and where they are connected to the above device. For example, additional shafts may be connected to the portion of the frame covering lower leg, thigh, waist or other portions of the body, to support various segments of the body while standing, walking, seated or lying down. An optional wheel 1914 attached to shaft 1913 may facilitate easy movement of the person when wearing leg support, while maintaining contact with the ground. Without limitation on the form, number or location on the frame, at least one joint 1908 in the frame, located near joints of the leg, facilitates flexion and extension of the limb. The frame also covers the toes to accommodate the bladders to exert pressure on the foot. The portion of the frame that covers the foot may have taller inner and outer sides, to allow for raising for displacement of the foot when pressure is exerted. The bladders may also cover the bottom of the foot in some embodiments, while it may be advantageous to leave the bottom portion uncovered (i.e., no bladders covering the sole of the foot), in some other embodiments for ease of mobility. Although not shown in the FIG. 9A, in some embodiments, various foot wear (e.g., shoes, boots) or orthotic devices may be modified to accommodate the bladders and the frame to exert desired gradient of pressure forces and off-load optimal weight from the foot, limbs, pelvis and torso of a person for ease of use and for esthetic purposes.

FIG. 9B provides detailed view of one embodiment of a part that can be used to minimize friction; in this case a ball bearing that may be used to minimize friction is shown, and comprises of a ball 1910 secured on top of several smaller ball bearings contained in a cup 1906. A material transfer ball bearing is shown here as an example. The ball bearing may be attached to a strap or a plate 1906 that conforms to the contours of the leg. There is no limitation on the size, number or pattern how the ball bearing and the strap are arranged around the leg. Multiple straps may be arranged around the leg and the back side of the strap may be attached to a soft cushion to evenly spread the pressure body surface.

There is no limitation on the size, shape or position of the strap, and a single sheet covering the entire leg may be used instead of straps in some cases. It should be noted that although, a leg is shown in the figure, the same mechanism can be extended up further to cover torso or other portions of the body. In a preferred embodiment, the suit covers approximately up to the Xiphoid process, below the rib cage.

The suit is secured to the torso and legs using various zippers, fasteners, straps or other similar means. used to exert a gradient of pressure against any part of the body or the whole body.

The suit described in FIG. 9A or earlier chair or stretcher type of devices can also be used for treatment of compartment syndrome (e.g., abdominal or muscle/tendon of leg), chronic venous insufficiency, various ulcers (e.g., venous ulcers or other types of chronic ulcers), burn injuries where either accumulation or excess loss of interstitial fluid is involved. When the suit described in FIG. 9A is extended up to the waist, the gradient hydrostatic pressure exerted, for example on the lower portion of the legs, and resulting off-loading of the weight, leads to migration of interstitial fluid into the intravascular space (e.g., superficial or deep veins), and then towards the central compartment. Such a negative pressure gradient (higher pressure in the interstitial space and lower pressure in the veins) causes interstitial fluid to be resorbed back into the systemic circulation, leading reduced fluid in the interstitial space in legs. The pressure gradient exerted and off-loaded weight, may be optimized based on the height of individual patient, the organ involved, posture and other factors. For example, it is known that blood pressure in legs change by as much as 65 mm Hg, if one changes from supine to standing position due to gravity [Malhotra et al., 2002, Blood pressure changes in leg on standing, J. Clin. Hypertens. 4: 350-354]. If the blood pressure at the calf region of the leg of a person in upright standing position were about 175 mm Hg, the pressure gradient exerted on the body by the bladders and the weight off-loaded can be modified either by modifying the density of the medium, increasing the pressure in the bladder to slightly exceed the 175 mm Hg pressure to maintain the negative pressure in the interstitial space. The advantages of the device is that when a person from a standing position, sits down or lies down the pressure on the calf region of the leg will reduce significantly, as the height of the fluid column in the device relative to the calf region also decreases. This is a major feature of the device and how it differs from the existing compression devices in the market. It is difficult to automatically adjust the pressure on the leg with various compressive bandages or gradient compression stockings currently used on legs, which exert a preset amount of pressure on the legs regardless of the posture of the person. This in some cases causes more damage by increasing the interstitial fluid pressure, sometimes decreasing the blood circulation or causing pressure sores.

Figure 10:
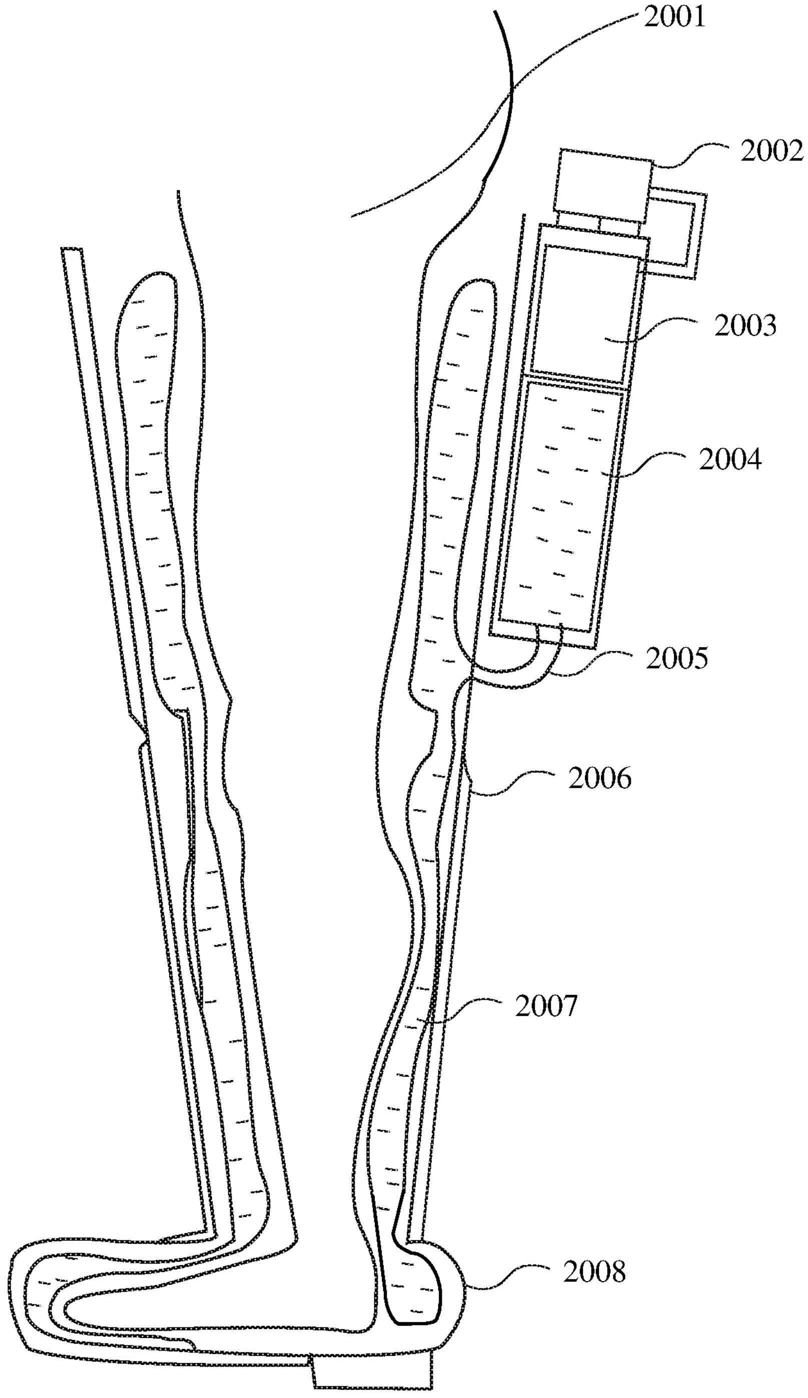
FIG. 10 shows another embodiment of a wearable suit, with bladders containing medium, reservoir containing medium, and frame to support on the whole body or at a particular location of the body such as an injured site, a wound or a site with excess fluid accumulation.

FIG. 10 depicts an additional embodiment of a portion of the wearable suit that can be used to exert a pressure gradient on the whole body or individual portions of body such as a leg 2001, torso, and the like. The device includes a small reservoir of fluid containing a fluid filled portion 2004 and a gas filled portion 2003 is connected via a tube 2005 to a bladder 2007 positioned around the leg 2001. The outward expansion of the bladder is limited by the outer sheet 2006, which is supported by a frame work (not shown) to support the weight of the person wearing the suit. The outer sheet 2006 and the supporting frame may be a single piece or multiple pieces joined together to facilitate movement of the person within, based on the pressure exerted on the frame. Bladders 2007 may also be present in the shoe 2008, and may be in communication with other bladders. The pressure in the reservoir may be altered by increasing or decreasing the pressure of the gas 2003 in the reservoir using a pump 2002.

Alternate means of increasing the pressure on the medium in the reservoir can be accomplished using a piston, springs, elastic material, bands, mechanical compression, etc. Increased pressure in the medium in the reservoir is transmitted to the bladder, which in turn increases the pressure exerted on the body. When the pressure gradient on the body and off-loaded weight on the body is similar to that achieved in a swimming pool, a person likely feels the same weightlessness (or feeling of buoyancy) as achieved in the pool.

The well-known Archimedes principle was based on the observation that for an immersed person to float in water, the person should displace an amount of water that is equivalent to the weight of the body in water. The suit shown in the FIG. 10 is designed to replicate a similar effect on the body, but with limited amount of liquid, and without the person getting in direct contact with the liquid. With this method, the body may be made fully or partially buoyant as required by the intended therapeutic effect.

Figure 11:
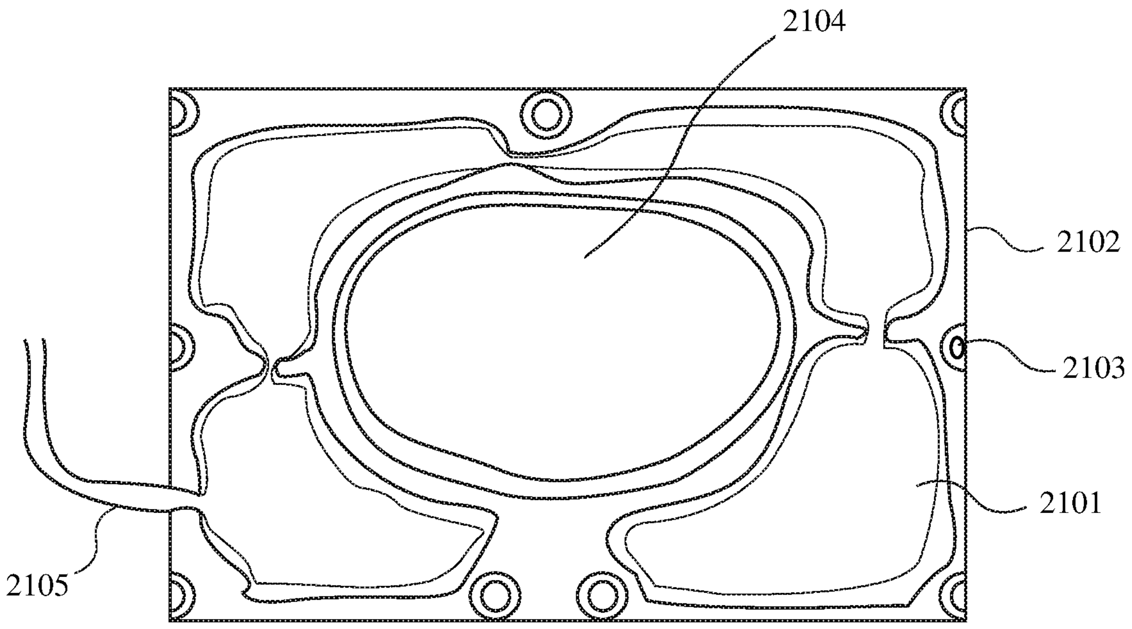
FIG. 11 is a cross sectional view of the suit shown in FIGS. 9 and 10, showing the body of the person in the center surrounded by bladders containing medium and frame.

FIG. 11 shows cross section of the same figure shown in FIG. 10, with leg 2104 in the center surrounded by bladders 2101, which may be interconnected and connected to an external reservoir through a hose 2105. The outer sheet 2102 is supported by frame work 2103, and may have an opening for the person to enter and exit the suit. The frame may be secured to the body of the person using fasteners a zipper, Velcro or similar means (not shown).

Figure 12:
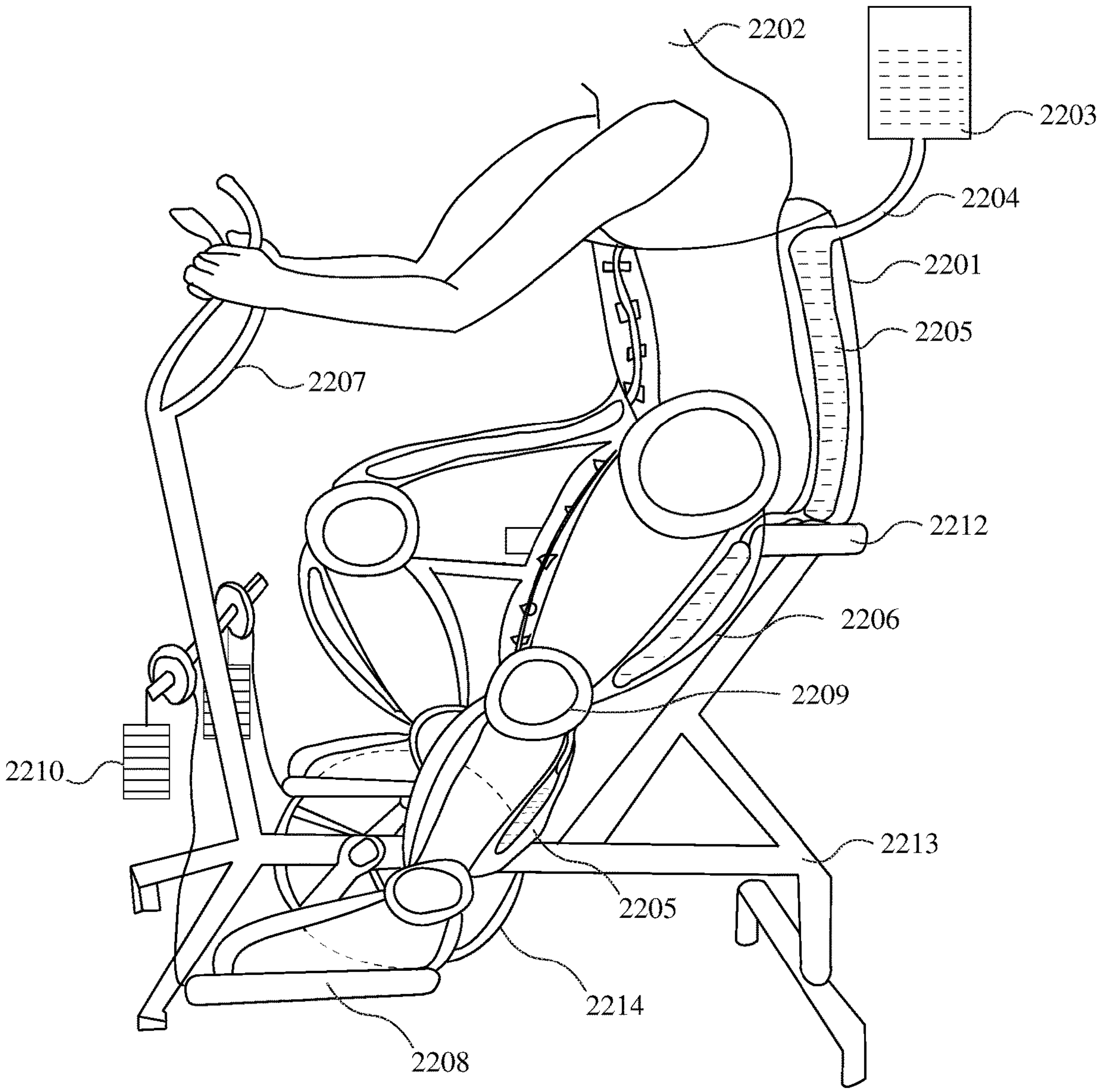
FIG. 12 is sectional view of aquatic exercise cycle, showing a person surrounded by medium to deliver a hydrostatic pressure, while exercising out of water.

FIG. 12 shows an embodiment of aquatic cycle, that can be used for exercise, outside of the pool, while experiencing the benefits of hydrostatic pressure gradient, and off-loading of the weight. The person 2202 sits on the stationary bike seat 2212, and is encased in the device 2201 that covers the torso, and legs. The device comprises of outer shell 2206, bladders 2205 contained within the shell 2206, which in turn are connected to an external reservoir 2203 via a connector tube 2204. The reservoir may be used to both fill and empty the bladders by gravity, pumps or other means. The shell may be made of a hard material to withstand the weight of the person, or in some embodiments made of a non-elastic material which may have supporting frame (not shown in the figure) to maintain the shape and provide support. The height and position of the bike seat 2212 is adjustable. A zipper 2211 on the front of the device 2201, allows the device to be opened for the person to enter and exit the device. Without limitation, additional means to secure the device to the body can be used (e.g., buckles, straps, Velcro). To enable the pedaling motion, hinges 2209 at hip, knee, and ankle join the shell 2206 at the joints. To maintain the pressure at the joints, additional bladders and non-stretchable but flexible seal may be provided. A crank 2214 is connected to pedals 2208, handles 2207 and to the stationary bike frame 2213. In some embodiments, the portions of shell 2206 may be fixed to the stationary bike at pedals 2208 and to the seat 2212.

Counter weights 2210 may be connected to pedals or other location of the device to compensate for possible imbalances in certain applications. There is no limitation on the form of pedals, crank and other features of the device to provide resistance to the person exercising (e.g., circular, linear, elliptical motion).

To exercise using the device in FIG. 12, initially the bladders are empty and the zipper of the device is open. The person enters the device and secures it to the torso and the legs by securing the zipper. The bladders are then inflated to the optimal pressure and the person starts the exercise program. To minimize friction between body surface and bladders or frame, various means including ball bearings described earlier in the application may be used (not shown in the figure). It should be noted that although bladders are included for the purposes of exerting hydrostatic pressure, in some embodiments, no bladders may be used, and the medium may directly contact the user's body to exert the hydrostatic pressure. The use of the device allows people to exercise at home, safely, without getting wet, or potential cross contamination in water, while receiving the benefits of hydrostatic pressure gradient on the body and ability to redistribute the body weight by off-loading on to a larger body surface area.

The chair embodiment shown in FIGS. 1 and 2, 3A-4 can also be fitted with various exercise devices (e.g., crank and pedals), to enable a person to exercise while seated in the chair.

Various embodiments described in this application including FIGS. 1-4, 9A, etc., may be used to minimize motion sickness in various conditions. Several theories exist to explain how motion sickness is caused, including sensory conflict and postural instability theories. It is also possible that additional mechanisms are there that cause motion sickness. Based on the observation of a driver of car not getting sick but the passenger gets sick, it is proposed that the disconnect between the afferent and efferent signals may be responsible for the motion sickness. The device can be used to create similar environment for the passenger, what the driver is experiencing, i.e., can give some control over the ability to control situation. To use the device in this situation, multiple individual bladders may be included in the space between the body surface and outer shell, and each bladder may be inflated/deflated independently. A user wearing the device and playing video game, can use the device in the following manner to exert control on the motion-sickness inducing environment. For example, if the car in the video game is turning left fast, then usually, in the real world, the person seated in the car is pushed to the right due to centrifugal force. To create a similar situation, the individual bladders arranged on left side of the torso may be pressurized more compared to the bladder on the right of the person, thereby forcing user to push against the left side bladders to stay upright and keep the balance. The video game controls need to be synchronized with various sensors and motors that pressurize individual bladders to achieve this (details not included in the figures). Similarly, a person can be forced to apply active pressure in various directions to maintain balance synchronized with the ever-changing environment in the video game. This kind of active interaction and ability to generate efferent motor nerve signals, allows a person to minimize sensory conflict related to virtual reality applications. Further, the device also acts to minimizes total quantity of the proprioceptive sensory feedback from various weight bearing regions of the body due to its ability to redistribute weight to the body surface, thereby, further decreasing the sensory conflict. There is no limitation on various methods and systems used to exert pressure on the body surface. For example, the individual panels of the frame may be moved to exert pressure on the bladders. When using video games, augmented or virtual reality applications, it is possible for one to synchronize changes in virtual environment to the gradient force exerted on the body by the bladders at individual locations of the body to reduce potential disconnect (or conflict) to reduce motion sickness.

Figure 13:
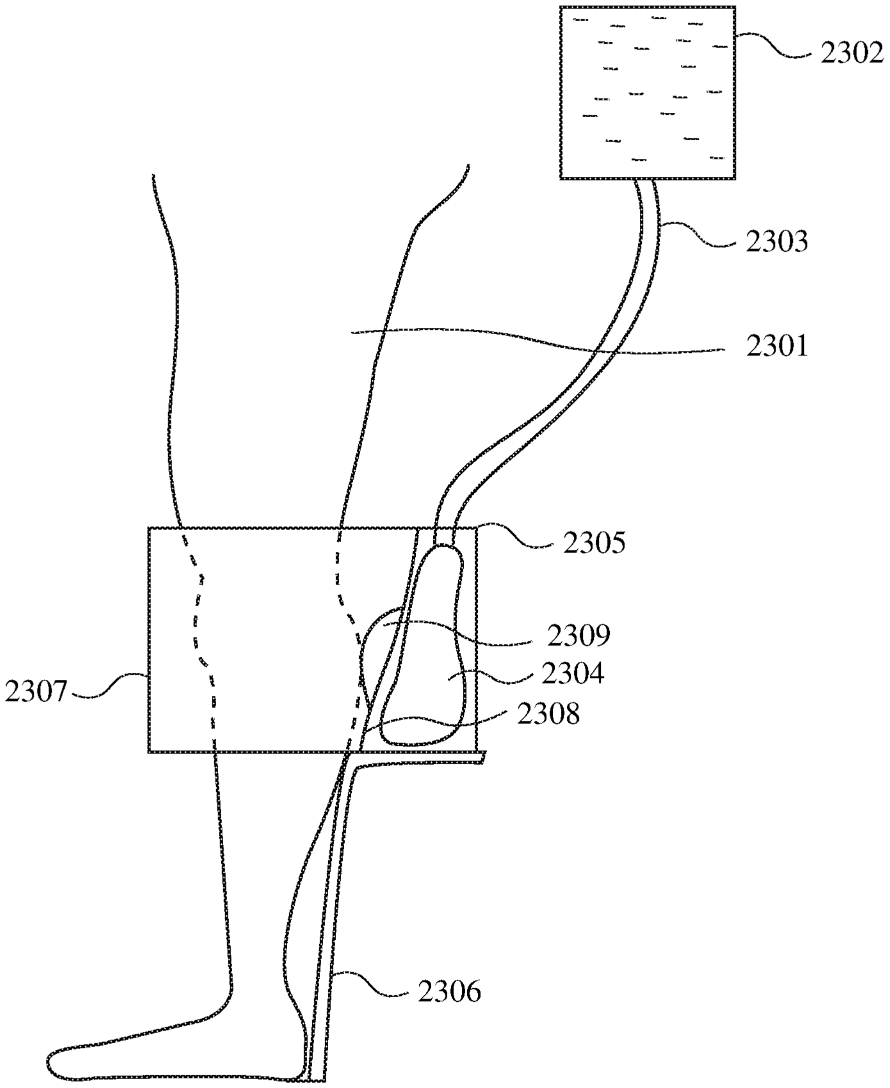
FIG. 13 is a Positive Pressure Wound Therapy Patch device, useful for exerting hydrostatic pressure on a wound to reduce edema of the tissue.

A device is shown in FIG. 13, applicable for treatment of chronic wounds. The device applies external positive pressure gradient on the wounds to prevent swelling of the tissue and oozing of the fluids. This is referred to as gradient Positive Pressure Wound Therapy (PPWT), hereafter, and the device in FIG. 13 will be referred to as PPWT Patch. It is known that edema of the wound delays healing. Using hydrostatic gradient positive pressure on the wound site prevents swelling, oozing of fluid, and encourages rapid healing and closure of the wound. Currently positive pressure is applied using bandages and wraps. However, these bandages exert a fixed amount of pressure on the wound, regardless of posture of the person, and the amount of pressure applied cannot be easily changed. As such, the wound area is subjected to non-optimal pressures in different postures, and can potentially delay wound healing. An optimal pressure should minimize accumulation of fluid in the interstitial space, but should not be high enough to reduce the blood circulation to the wound area. The device described in FIG. 13 PPWT Patch overcomes these drawbacks, as it exerts optimal pressure regardless of the person's posture.

The device in FIG. 13 can be wrapped around a body part, for example the leg 2301 of a person. The device comprises of an outer layer 2305, that may be rigid and non-stretchable, supported by a frame 2306 which can be made of rods, tubes or panels. The frame provides support to the leg, the outer layer and the fluid contained within. The frame 2306 may rest on an external support such as floor or a shoe, and relieves the load of the device from the body. In some embodiments, the outer-layer may be secured to the body using a wrap 2307, or Velcro, ties etc. An inner layer 2308, that is flexible and stretchable to conform to the wound surface, joins the outer layer to enclose a space to hold medium that exerts hydrostatic pressure on the wound 2309. The space formed by the outer and inner layers is connected to a fluid reservoir 2302 via a tube 2303 to change the hydrostatic pressure in the space. In some embodiments, a bladder 2304 to hold the liquid may be included in the space formed by the outer and inner layers.

The PPWT Patch device does not have to come in direct contact with the wound, and can be placed on top of other wound dressings or even on the Negative Pressure Wound Therapy (NPWT) dressing. The average pressure gradient to be exerted on the wound by the PPWT Patch depends on the body posture, and location of the wound on the body. For example, the average pressure can be high enough to prevent excess fluid accumulation in the interstitial space, while not too high enough to collapse the capillaries providing the blood supply to the wound area. Lower or higher average pressure gradients may be used based on individual patient condition, and if rapid or slower response is desired.

To use the PPWT Patch, the device is secured on to the wound to be treated with the inner layer covering the wound plus the surrounding area, using a wrap or Velcro straps. The height of the frame is adjusted to rest on an external support such as bed, chair or in case of leg wounds, on the floor or shoes, to prevent the PPWT Patch from hanging on to the leg. Then, the external reservoir with the fluid is connected to the bladder and filled with the fluid. The reservoir position is raised to adjust the pressure and the device secured in place using an external frame or to the body of the person. The reservoir, for example can be placed in the pockets of the person. Therefore, when a person is standing, there would more pressure on the wound, but when the person is seated the external pressure is reduced. The pressure will become almost negligible when the person lies down, as the reservoir will be at the same level as the leg, unless the reservoir level is changed. Increased external pressure from the device, prevents further buildup of the interstitial fluid at the wound site, shrinks the wound edges to promote rapid healing. Note that the PPWT Patch device is different from the NPWT device available in the market [Reference: Morykwas, M. J., Argenta, L. C., Shelton-Brown, E. I., McGuirt, W. (1997) Vacuum-assisted closure: a new method for wound control and treatment: animal studies and basic foundation. Ann Plast Surg. 38 (6) 553-562], and can be used in conjunction with the NPWT device.

In addition to the device shown in FIG. 13, other embodiments presented in this application including FIGS. 1, 2, 9A and 12 may be used for the treatment of chronic wounds.

Accordingly, the embodiments described herein relating to the devices and methods for exerting a gradient of external compressive forces on the body of a person and redistribute the load from the primary weight bearing regions to a larger surface of the body to provide several functions, including, but not limited to:

1. Applying hydrostatic gradient of pressure
2. Make a person feel weightlessness without being immersed in water
3. Decrease load on primary weight bearing parts
4. Cause fluids to shift upward from the dependent portions of the body (towards head, when standing or sitting; to front side if someone is sleeping on the back)
5. Decrease total peripheral resistance.
6. Increase diuresis
7. Increase preload and stroke volume of heart
8. Decrease total peripheral resistance
9. Decrease cardiac load, and
10. Decrease sympathetic tone.

It is appreciated by persons skilled the art that the present invention is not limited by what has been particularly shown and describe herein above. Rather the invention includes a both combinations and sub-combinations of various features described.

In addition, the described embodiments are not intended to be limiting.

Bladders are mentioned in this application to exert gradient of pressure. However, a gradient of pressure can be administered on the body without using the bladders using several means. For example, medium can directly contact the body surface. Without any limitation, various forms of materials such as soft foam, bristles, springs, rollers, etc., may be used to line the interior of the outer layer to exert gradient of pressure. In certain instances, a compression stocking with appropriate modifications such as adding compressible material inside, and a frame to support the weight of the person may be used to exert a gradient pressure. In certain embodiments, individual balloons of various sizes inflated to different pressures may be used to exert a gradient of pressure.

The chair or suit can also be suspended from a ceiling or a larger supporting structure, as in the case of a hammock or a swing chair.

It should be noted that although, the figures show only a limited number of bladders, there is no limitation on the size and number of bladders, pattern of their arrangement, and how they are connected to one another and to the individual reservoirs containing fluid, and the order in which they are filled or emptied.

One of the goals of the systems and methods described in this application is to exert hydrostatic forces on the body of a person that are like the forces a person experiences when immersed either partially or completely in water. It should be noted that a wide range of pressure gradient can be exerted on the body of the user, and a wide range of weights can be off-loaded, using either the chair-type or the suit type devices mentioned in this application (e.g., FIGS. 1, 9 and 10). As an example, one example, to simulate the conditions experienced by a person standing partially immersed up to chest, with head out of water, in a 4 feet-deep swimming pool, the following calculations may be used to calculate the pressure to be exerted on the body:

The apparent feeling of weightlessness a person experiences when immersed in water is due to redistribution of pressure from the bottom of feet and other weight-bearing regions to the body surface that is immersed and displacing the water. For example, a person displacing about 150 lbs of water will experience 150 lbs of total buoyancy on the body. Assuming the body surface area of the person immersed under water is 2000 square inches, then the average hydrostatic pressure on the portion of the body immersed under the water equals to 150 lbs/2000 sq. in=0.075 PSI (or 3.878613 mmHg).

However, this hydrostatic pressure exerted by water in the pool is unevenly distributed on the body, with pressure increasing with the depth of the water. Each one foot increase in the depth of water leads to an increase in hydrostatic pressure of 0.4335 PSI (22.418383 mmHg). Therefore, although the average hydrostatic pressure experienced by the person displacing 150 lbs of water is 0.0175 PSI, this pressure is unevenly distributed on the body, with the higher pressure on feet and lower pressure going towards the head, if the person were to be standing upright in water. Assuming the person is standing in 4 feet deep water, the hydrostatic pressure on the feet of the person is about 1.734 PSI (89.67 mmHg), while the hydrostatic pressure on the body at the water surface is close to zero. It should be noted that the atmospheric pressure of 14.695975 PSI or 760 mmHg is not included here. When a person is using the chair, suit or other type of devices described in this application, by changing the specific gravity and amount of the fluid, one can use either higher or lower volume of the fluid when exerting pressure gradient and the amount of weight off-loaded. By altering the density of the fluid, for example using a salt solution to increase the density, the gradient of hydrostatic pressure on a person can be modified. Further, the pressure gradient on the body surface can also be changed by increasing the pressure in the bladders, and by extension, the amount of weight off loaded, either by increasing or decreasing the height of the fluid reservoirs. Although, fluid reservoirs are shown in several embodiments shown various figures in this application, the objective is to convey that the pressure can be modified, rather than suggesting that only fluid reservoirs should be used in these embodiments. In the preferred embodiments, it may be desirable to use either manual or an automated pump that can pump a liquid or a gas to increase or decrease the pressure in the bladder to reach the optimum pressure.

It should also be noted that the direction of the pressure gradient, can change depending on the position of individual portions of the body. While it may be advantageous to have decreasing pressure gradient from toes to head in a person standing upright, it is may be desirable to have decreasing pressure gradient from back to the front (posterior to the anterior position), if the person were to be lying in supine position while using one of the devices.

Although, it may be advantageous to apply a pressure gradient on all four sides of the body of the person, in certain situations it may be adequate to apply the pressure on at least two opposite directions on the body. The unique characteristics of the system mentioned in this application is that it requires application of force on the body surface on at least two opposite directions on the person's body.

Regarding the substance that exerts gradient of forces, several combinations of substances including gas, liquid and solid or a combination of them may be used. For example, very fine granular solid material may be able to exert similar hydrostatic forces as a liquid medium. Similarly, a combination of lubricating oil and small balls made of either plastic, ceramic, metal or other material with optimal density to keep them suspended may be desirable over liquid medium.

It should also be noted that a reservoir of fluid and bladders connected to these reservoirs through tubes are included in the figures in the descriptions of various embodiments of the throughout this application. However, it should be noted that other methods of increasing the pressure in the bladder are available, and are not limited to panels that slide in a desired direction and cause the pressure in the bladder to increase or decrease.

An additional application of the chair type device mentioned in this application is that people traveling by air planes, especially in the coach class over long distance, often are squeezed into limited space leading to back pain, deep vein thrombosis, and often get tired as they are unable to sit comfortably. The devices described in FIGS. 1 to 4 or other embodiments may be appropriately modified to distribute the weight of the seated person all over the body, rather than just on the thighs or the spine, as is the case in conventional seats. It should be noted that one does not require large volumes of liquid (substance) to generate the desired effect.

The devices differ from the prior art in several respects. I) In case of the conventional chairs or vehicle seats, a person sitting on chair usually leans back onto the backrest to relieve any stress on the back or relieve back pain. So only one side of the body (back side) is used for redistributing the weight in the traditional chairs. In the current device, all four sides of the body may be used to redistribute the pressure to relieve the pressure on the thighs or feet. One device in prior art, has bladders filled with water handing on the back rest and exerts pressure on the back of a person, but again it is only on the back. II) Mostly air was used in previous devices that are used for exerting pressure on the body, which include compression suits, anti-g suit, alter-g tread mill, Non-pneumatic anti-shock garment (Ref: Cynthia Pileggi-Castro, et al, Reprod Health. 2015; 12: 28). However, they were not designed to for exerting a gradient of pressure as a liquid. III) Some devices in the prior art had used water to exert hydrostatic forces—for example, hydro-boot, various massage devices, mercury sleeve, bathtubs, etc.

However, none of them are designed to off-load the weight of the person onto a frame. Therefore, previous devices either exert heavy weight on the user (hydro-boot), toxic to use, get people wet and not convenient. Most of the earlier devices are also intended for use on a selected portion of the body part such as a single limb or arm. Providing a firm outer frame that is designed to bear the weight of the person is an unique feature of this device. Further, allowing an user to experience buoyancy like feeling is also an unique feature of this device, which also relieves loads on the various joints and muscles on the body, including back. IV) Some devices such as water bed, flotation beds, allow people to experience the feeling of floating without actually getting wet. However, no chair type devices are available in the prior art, that can allow a person to float while seated. V) External counter current pulsation (ECCP) and several variations of this method is used to sequentially exert compression on the limbs and body of a person to increase venous return to the heart, and is indicated for treatment of angina and certain conditions. The current device significantly differs from the ECCP in that, no sequential compression is used. Instead the current devices create a pressure differential in the body of the person, leading to shifting of the fluid from extravascular space to the central compartment, relieving load on the heart.

Various devices such as Medtronic's Simplicity system was used to selectively destroy the renal sympathetic innervation to reduce the sympathetic tone there by helping the kidneys to get rid of more fluid in hypertensive patients. The current system tones down the vascular sympathetic tone in both the kidneys, lower limbs and other locations in the body by reducing total peripheral resistance and creating a pressure gradient that obviates the need for the sympathetic mediated vascular contraction to maintain the central blood pressure. VII) This is the first device (other than the water immersion) that is designed to induce diuresis, reduce edema without pharmacological treatment. VIII) Also, it is the first device that can be used safety in pregnant women to potentially treat preeclampsia/eclampsia and postpartum cardiomyopathy. IX) This is also the first device that is focused on splanchnic circulation to alleviate motion sickness. X) Previous devices to treat lymphedema or general edema are focused on providing local compression without addressing the overall hydrostatic pressure resulting from the systemic circulation. This is the first device address both the local forces as well as the system hydrostatic forces.

The invention claimed is:

1. A system, comprising:

a hollow chair shaped supporting frame comprising fluid filled bladders, wherein the hollow chair shaped supporting frame is adapted to support a person and is adapted to encloses at least a portion of the person and comprises one or more movable panels;

wherein a first side of a subset of the fluid filled bladders is in contact with the hollow chair shaped supporting frame and a second side is adapted to be in contact with the person;

wherein the fluid filled bladders are adapted to exert a gradient of force on the portion of the person, wherein a fluid in the fluid filled bladders is a liquid, wherein the gradient of force simulates a hydrostatic force exerted on the portion of the person when the person is immersed in water;

wherein the gradient of force is modified using a combination of moving the one or more movable panels and by a level of the fluid in the fluid filled bladders; and wherein the fluid filled bladders are adapted to redistribute weight of the person from primary weight bearing regions to a body surface of the person.

2. The system of claim 1, wherein the gradient of force is modified by modifying a density of the fluid in the fluid filled bladders.

3. The system of claim 1, wherein the system comprises a plurality of sensors to record physical parameters of the fluid and physiological parameters of the person.

4. The system of claim 1, wherein the movable panels are further configured to move and allow for change of size and shape of the hollow chair shaped supporting frame, for an entry and exit of the person, wherein the movable panels comprise a first vertical panel configured to cover at least a front portion of a torso, a horizontal panel configured to cover at least a first portion of a thigh, and a second vertical panel configured to cover at least a second portion of a lower part of a leg and a feet.

5. The system of claim 4, wherein the system is operable to prevent or treat the person with one or more of an intra-dialytic hypotension, a gestational hypertensive disorder, a condition related to a heart failure, a stroke, a clinical shock, a burn injury, a chronic venous ulcer, musculoskeletal disorders of weight bearing regions, orthostatic hypotension, migraine, nausea and vomiting from various causes, preventing motion sickness, abdominal compartment syndrome, fluid resuscitation, ascites, back pain, deep vein thrombosis, diuresis, edema, lymphedema, preeclampsia, eclampsia, postpartum cardiomyopathy, and neurologic disorders originating from hemodynamic disorder.

6. A system, comprising:

a hollow stretcher or a bed shaped supporting frame comprising fluid filled bladders, wherein the hollow stretcher or the bed shaped supporting frame is adapted to support a person in lying position, and is adapted to encloses at least a portion of the person and comprises one or more movable panels;

wherein a first side of a subset of the fluid filled bladders is in contact with the hollow stretcher or the bed shaped supporting frame and a second side is adapted to be in contact with the person;

wherein the fluid filled bladders are adapted to exert a gradient of force on the portion of the person, wherein a fluid in the fluid filled bladders is liquid, wherein the gradient of force simulates a hydrostatic force exerted on the portion of the person when the person is immersed in water;

wherein the gradient of force is modified using a combination of moving the one or more movable panels and by a level of the fluid in the fluid filled bladders; and wherein the fluid filled bladders are adapted to redistribute weight of the person from primary weight bearing regions to a body surface of the person.

7. The system of claim 6, wherein the gradient of force is modified by modifying a density of the fluid.

8. The system of claim 6, wherein the system comprises structures that are configured for facilitating a smooth sliding of the fluid filled bladders against the body surface that the fluid filled bladders come in contact with; and wherein the structures comprise at least one of a roller and a bearing.

9. The system of claim 6, wherein the fluid filled bladders communicate with open air.

10. The system of claim 6, wherein the movable panels are configured for at least one of raising, lowering, and moving to a desired position.

11. A system, comprising:

a hollow wearable suit shaped supporting frame comprising fluid filled bladders;

wherein a first side of a subset of the fluid filled bladders is in contact with the hollow wearable suit shaped supporting frame and a second side is adapted to be in contact with a person;

wherein the fluid filled bladders are adapted to exert a gradient of force on a portion of the person, wherein a fluid in the fluid filled bladders is a liquid, wherein the gradient of force simulates a hydrostatic force exerted on the portion of the person when the person is immersed in water;

wherein the gradient of force is modified by a level of the fluid in the fluid filled bladders; and the fluid filled bladders are adapted to redistribute weight of the person from primary weight bearing regions to a body surface of the person; and wherein the hollow wearable suit shaped supporting frame is adapted to enclose the portion of the person and is adapted to secured around a body part of the person.

12. The system of claim 11, wherein the hollow wearable suit shaped supporting frame is connected to a support configured to rest on an area to bear majority weight of the wearable suit and the person.

13. The system of claim 11, wherein the fluid filled bladders communicate with open air.

14. The system of claim 11, wherein the fluid filled bladders are selectively filled.

15. The system of claim 11, wherein the fluid filled bladders are filled with the fluid up to a level or such that the fluid filled bladders obtain a pre-specified size.

16. A system, comprising:

an exercise machine comprising a hollow casing shaped supporting frame comprising fluid filled bladders and adapted to encase at least a portion of a person;

wherein the hollow casing shaped supporting frame comprises one or more movable panels;

wherein a first side of a subset of the fluid filled bladders is in contact with the hollow casing shaped supporting frame and a second side is adapted to be in contact with the person;

wherein the fluid filled bladders are adapted to exert a gradient of force on the portion of the person, wherein a fluid in the fluid filled bladders is a liquid; wherein the gradient of force simulates a hydrostatic force exerted on the portion of the person when the person is immersed in water;

wherein the gradient of force is modified using a combination of moving the one or more movable panels and by a level of the fluid in the fluid filled bladders; and wherein the fluid filled bladders when holding the fluid are adapted to redistribute weight of the person from primary weight bearing regions to a body surface of the person.

17. The system of claim 16, wherein the hollow casing shaped supporting frame is made of a hard material to withstand and support weight of the person and to maintain shape.

18. The system of claim 16, wherein the exercise machine comprises one of an aquatic cycle, an elliptical exercise machine, a stationary bike, a stair climber, and a treadmill.

19. The system of claim 16, wherein the hollow casing shaped supporting frame comprises a hinge corresponding to a flexible joint of the person to enable motion required for an exercise.

20. The system of claim 19, wherein the hinge comprises a non-stretchable and flexible seal and is configured to correspond to the flexible joint of the person.

* * * * *